United States Patent
Foster et al.

(10) Patent No.: US 11,638,212 B2
(45) Date of Patent: Apr. 25, 2023

(54) MULTI-INTERFACE TRANSPONDER DEVICE—ALTERING POWER MODES

(71) Applicant: Chadra Laboratories LLC, Denver, CO (US)

(72) Inventors: James H. Foster, Oxford (GB); Marlene Nilsen, London (GB); Paul G. Puskarich, London (GB)

(73) Assignee: Chadra Laboratories LLC, Denver, CO (US)

(*) Notice: Subject to any disclaimer, the term of this patent is extended or adjusted under 35 U.S.C. 154(b) by 68 days.

(21) Appl. No.: 17/328,892

(22) Filed: May 24, 2021

(65) Prior Publication Data

US 2021/0345246 A1    Nov. 4, 2021

Related U.S. Application Data

(63) Continuation of application No. 16/800,523, filed on Feb. 25, 2020, now Pat. No. 11,019,567.
(Continued)

(51) Int. Cl.
*H04W 52/02* (2009.01)
*G06F 1/3287* (2019.01)
(Continued)

(52) U.S. Cl.
CPC .......... *H04W 52/0225* (2013.01); *G06F 1/28* (2013.01); *G06F 1/3287* (2013.01);
(Continued)

(58) Field of Classification Search
CPC ........... H04W 52/0225; H04W 52/322; H04W 4/029; H04W 88/06; G06F 1/28; G06F 1/3287; G06F 1/3296
(Continued)

(56) References Cited

U.S. PATENT DOCUMENTS 7,492,251 B1   2/2009   Katz
7,613,484 B2   11/2009  Lappetelainen
(Continued)

FOREIGN PATENT DOCUMENTS

EP   1441235      7/2004
JP   2016529757   9/2016
(Continued)

OTHER PUBLICATIONS

Office Action for KR Patent Application No. 10-2022-0052174; 5 pages; dated Jul. 14, 2022.
(Continued)

*Primary Examiner* — Mong-Thuy T Tran
(74) *Attorney, Agent, or Firm* — Kowert, Hood, Munyon, Rankin & Goetzel, P.C.

(57) ABSTRACT

Methods for performing power management of a multi-interface transponder (MIT) device, e.g., such as positional tag device. The MIT device may transition between various power states, e.g., based on detected events, such as detecting movement of the MIT device, receiving a wakeup signal, receiving an indication of a transition in transportation mode, and/or detecting that the MIT device may be lost, such as based on a lack of contact with another device for more than a threshold period of time.

20 Claims, 17 Drawing Sheets

Related U.S. Application Data

(60) Provisional application No. 62/810,492, filed on Feb. 26, 2019.

(51) Int. Cl.
  *G06F 1/3296* (2019.01)
  *H04W 4/029* (2018.01)
  *H04W 52/32* (2009.01)
  *G06F 1/28* (2006.01)
  *H04W 88/06* (2009.01)

(52) U.S. Cl.
  CPC .......... *G06F 1/3296* (2013.01); *H04W 4/029* (2018.02); *H04W 52/322* (2013.01); *H04W 88/06* (2013.01)

(58) Field of Classification Search
  USPC ........................................................ 455/457
  See application file for complete search history.

(56) References Cited

U.S. PATENT DOCUMENTS

| | | | |
|---|---|---|---|
| 8,041,330 B1 | 10/2011 | Garin | |
| 8,175,661 B2 | 5/2012 | Park et al. | |
| 8,509,860 B2* | 8/2013 | Heshmati | H04W 4/029 |
| | | | 455/574 |
| 9,100,891 B2 | 8/2015 | Zheng | |
| 9,226,233 B2 | 12/2015 | Liu | |
| 9,374,673 B2 | 6/2016 | Mendelson | |
| 9,386,610 B2 | 7/2016 | Dunsbergen | |
| 9,538,468 B2* | 1/2017 | Radhakrishnan | H04W 76/28 |
| 9,600,996 B2 | 3/2017 | Boyd | |
| 9,681,842 B2 | 6/2017 | Zdeblick | |
| 9,872,151 B1* | 1/2018 | Puzanov | H04L 67/02 |
| 9,913,216 B1* | 3/2018 | Deshpande | H04W 28/14 |
| 10,039,148 B2 | 7/2018 | Singh | |
| 10,285,129 B2 | 5/2019 | Song | |
| 10,292,136 B2 | 5/2019 | Rubin | |
| 10,341,918 B2 | 7/2019 | Cho | |
| 10,512,034 B2* | 12/2019 | Prasad | H04W 84/18 |
| 10,694,473 B2 | 6/2020 | Hellhake | |
| 2002/0119791 A1* | 8/2002 | Bai | G01S 1/68 |
| | | | 455/457 |
| 2007/0030156 A1* | 2/2007 | Schlager | G08B 21/023 |
| | | | 340/573.1 |
| 2008/0278372 A1 | 11/2008 | Ruperto | |
| 2012/0235860 A1 | 9/2012 | Ghazarian | |
| 2014/0030982 A1 | 1/2014 | Cardona | |
| 2014/0228059 A1 | 8/2014 | Jalali | |
| 2015/0126234 A1* | 5/2015 | Rodriguez | H04M 1/72412 |
| | | | 455/457 |
| 2016/0174280 A1 | 6/2016 | Singh | |
| 2016/0178727 A1 | 6/2016 | Bottazzi | |
| 2016/0286483 A1 | 9/2016 | Bergstrom | |
| 2016/0335876 A1 | 11/2016 | Verma | |
| 2017/0013569 A1 | 1/2017 | Braxton | |
| 2018/0174009 A1 | 6/2018 | Scleef | |
| 2018/0184377 A1 | 6/2018 | Kenney | |
| 2018/0255422 A1 | 9/2018 | Montemurro | |
| 2019/0069239 A1 | 2/2019 | Li | |
| 2019/0331754 A1 | 10/2019 | Chedrawy | |
| 2019/0364492 A1 | 11/2019 | Azizi | |

FOREIGN PATENT DOCUMENTS

| | | |
|---|---|---|
| KR | 10-0757886 | 9/2007 |
| WO | 2006001074 | 1/2006 |
| WO | 2018060571 | 4/2018 |
| WO | 2018085635 | 5/2018 |
| WO | 2019005942 | 1/2019 |
| WO | 2020031155 | 2/2020 |

OTHER PUBLICATIONS

Djiroun et al. "MAC Protocols with Wake-Up Radio for Wireless Sensor Networks: A Review" IEEE Communications Surveys & Tutorials, vol. 19, No. 1, First Quarter 2017, pp. 587-618.

Zemouri et al. "Smart Adaption of Beacons Transmission Rates and Power for Enhanced Vehicular Awareness in VANETs", Oct. 8-11, 2014 Qingdao, China, 8 pages.

Partial European Search Report for EP Patent Application No. 20159620.2-1205, dated Jul. 21, 2020, 15 pages.

Examination Report for Australian Patent Application No. 2020201388; 4 pages; dated Jan. 27, 2022.

\* cited by examiner

MULTI-INTERFACE TRANSPONDER DEVICE—ALTERING POWER MODES

PRIORITY DATA

This application is a continuation of U.S. patent application Ser. No. 16/800,523, entitled "Multi-Interface Transponder Device—Altering Power Modes," filed Feb. 25, 2020, which claims benefit of priority to U.S. Provisional Application Ser. No. 62/810,492, titled "Multi-Interface Transponder Device", filed Feb. 26, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, including techniques for the design and operation of a multi-interface radio frequency transponder device (or "tag").

DESCRIPTION OF THE RELATED ART

Positional tags, such as electronic tracking devices, have created numerous ways for users to track locations of associated people and/or objects. For example, global positioning system (GPS) technology can be used to determine the location of a tagged object associated with a person, and the location can be communicated to another device. As a further example, a positional tag could be attached to an item of importance (e.g., keys, wallet, briefcase, article of clothing, backpack, computing device, item of identification, and so forth) and via communication with a companion device (e.g., phone, tablet, laptop computer, Internet of Things (IoT) device, and so forth), the positional tag could update the location of the item of importance and help with recovery if the item is missing.

Traditional positional tags (or tracking devices) and corresponding systems typically suffer from one or more disadvantages. For example, communicating with a positional tag outside of near field communications requires, relative to the form factor, a considerable amount of power. Thus, battery life of positional tags is often limited. In addition, long-range communication for such a device is relatively expensive and often requires sophisticated circuitry for operating in connection with an associated electronic device (e.g., a mobile device). Additionally, low-power options for positional tags are often limited to communicating with nearby objects that may require a user associated with the tracking device(s) to be within a close proximity (e.g., near field) of the positional tags, limiting the usefulness of such devices.

SUMMARY

Embodiments described herein relate to a multi-interface transponder (MIT) device, e.g., such as positional tag device. Additionally, embodiments described herein relate to power management of MIT devices as well as various applications of such devices. Some embodiments relate to a wireless station configured to communicate with an MIT device, e.g., to determine and/or update location of the MIT device with a location server and/or to aid a user of an MIT device to physically locate the MIT device when misplaced and/or lost.

In some embodiments, an MIT device may be configured to determine, while operating in a first power state, to transition to a second power state based, at least in part, on detection of an event. In some embodiments, the event may be detectable via one of a first interface or motion sensing circuitry of the MIT device. Further, while operating in the second power state, the MIT device may be configured to transmit one or more beacons via one of a second interface or a third interface of the MIT device. In some embodiments, selection of the second interface or the third interface may be based, at least in part, on the event. In some embodiments, the first interface may be an ultra-low power radio frequency (RF) interface (e.g., such as a wake-up radio and/or wake-up receiver), the second interface may be a Bluetooth interface, and the third interface may be an ultra-wideband (UWB) RF interface. In some embodiments, the first power state may be associated with a low power consumption (e.g., sleep) state whereas the second power state may be associated with a higher power consumption state. For example, the second state may be associated with transmission of Bluetooth beacons (or signals) at a first or second rate and/or associated with transmission of UWB beacons (or signals). In some embodiments, the MIT device may be configured to receive, from a neighboring wireless device, an indication that a location associated with the MIT device has been updated at a location server that may be associated with both the neighboring wireless device and the MIT device. Upon receiving the indication, the MIT device may be configured to transition, based, at least in part, on the indication, to the first power state.

In some embodiments, an MIT device may be configured to enter a low power mode in which the second radio is disabled and receive, while in the low power mode, a wake-up signal from a neighboring wireless device. In some embodiments, the wake-up signal may be received via low-power/ultra low power (LP/ULP) communications. The MIT device may be configured to transmit, after transitioning to a higher power mode in response to receipt of the wake-up signal, beacons via the second radio. In some embodiments, the wakeup signal may indicate a transmission rate that may be based, at least in part, on one or more of a transportation mode detected by the neighboring wireless device and/or an expected medium congestion as detected by the neighboring wireless device. In some embodiments, the wakeup signal may indicate a transmission power that may be based, at least in part, on one or more of a transportation mode detected by the neighboring wireless device and/or an expected medium congestion as detected by the neighboring wireless device. In some embodiments, the second radio may comprise an ultra-wideband radio.

In some embodiments, an MIT device may be configured to operate in a low power mode in which an ultra-wide band (UWB) radio of the MIT device may be disabled. The MIT device may be configured to receive, while operating in the low power mode, a wake-up signal from a neighboring wireless device and transition out of the low power mode and enable the UWB radio in response to receipt of the wake-up signal. In some embodiments, the wake-up signal may be received by an ultra-low power radio, e.g., via ULP/LP communications with the neighboring wireless device. The MIT device may be configured to transmit, via the UWB radio, location beacons to the neighboring wireless device. In some embodiments, the wakeup signal may be received via one of a Bluetooth radio or an ultra-low power radio (e.g., such as a wake-up radio and/or wake-up receiver) in communication with the at least one processor. In some embodiments, the wakeup signal may indicate a transmission rate and a transmission power for the location beacons.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
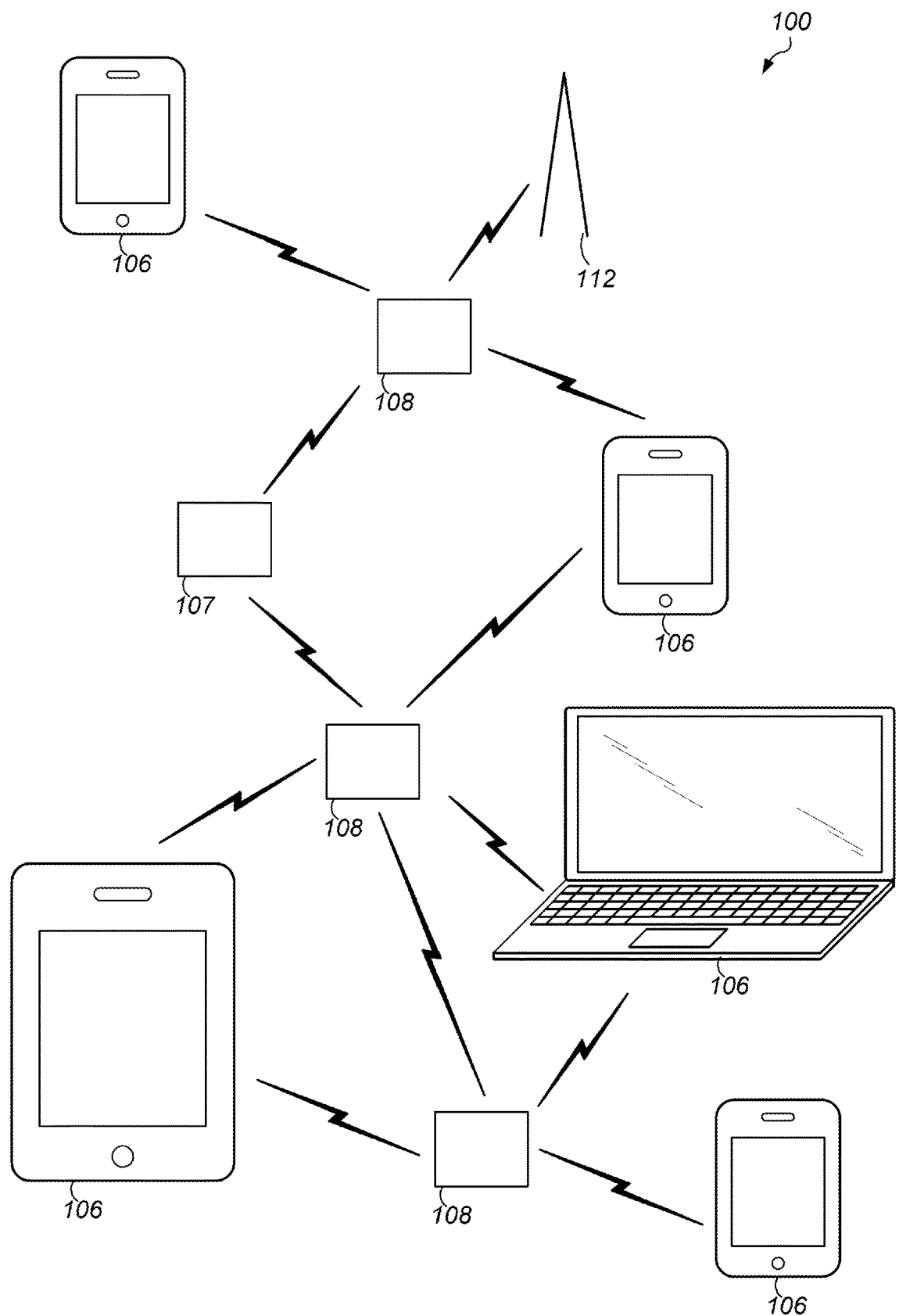
FIG. 1 illustrates an example of a wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
TX: Transmission/Transmit
RX: Reception/Receive
WURx: Wake up to receiver
UWB: Ultra-wideband
BT/BLE: BLUETOOTH™/BLUETOOTH™ Low Energy
LP/ULP: Low power/ultra-low power communications
LAN: Local Area Network
WLAN: Wireless LAN
RAT: Radio Access Technology
TTL: time to live
SU: Single user
MU: Multi user

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Positional Tag (or tracking device)—any of various types of computer systems devices which are mobile or portable and which performs wireless communications, such as communication with a neighboring or companion device to share, determine, and/or update a location of the positional tag. Wireless communication can be via various protocols, including, but not limited to, Bluetooth, Bluetooth Low Energy (BLE), Wi-Fi, ultra-wide band (UWB), and/or one or more proprietary communication protocols.

Mobile Device (or Mobile Station)—any of various types of computer systems devices which are mobile or portable and which performs wireless communications using WLAN communication. Examples of mobile devices include mobile telephones or smart phones (e.g., iPhone™, Android™ based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

FIG. 1—Wireless Communication System

FIG. 1 illustrates an example wireless communication system, according to some embodiments. It is noted that the system of FIG. 1 is merely one example of a possible system, and embodiments of this disclosure may be implemented in any of various systems, as desired. As shown, the exemplary system 100 includes a plurality of wireless client stations or devices, or user equipment (UEs), 106 that are configured to communicate wirelessly with various components within the system 100, such as an Access Point (AP) 112, other client stations 106, wireless nodes 107, and/or positional tag devices 108. Some implementations can include one or more base stations in addition to, or in place of, AP 112. The AP 112 may be a Wi-Fi access point and may include one or more other radios/access technologies (e.g., Bluetooth (BT), ultra-wide band (UWB), etc.) for wirelessly communicating with the various components of system 100. The AP 112 may communicate via wired and/or wireless communication channels with one or more other electronic devices (not shown) and/or another network, such as the Internet. The AP 112 may be configured to operate according to any of various communications standards, such as the various IEEE 802.11 standards as well as one or more proprietary communication standards, e.g., based on wideband, ultra-wideband, and/or additional short range/low power wireless communication technologies. In some embodiments, at least one client station 106 may be configured to communicate directly with one or more neighboring devices (e.g., other client stations 106, wireless nodes 107, and/or positional tag devices 108), without use of the access point 112 (e.g., peer-to-peer (P2P) or device-to-device (D2D)). As shown, wireless node 107 may be implemented as any of a variety of devices, such as wearable devices, gaming devices, and so forth. In some embodiments, wireless node 107 may be various Internet of Things (IoT) devices, such as smart appliances (e.g., refrigerator, stove, oven, dish washer, clothes washer, clothes dryer, and so forth), smart thermostats, and/or other home automation devices (e.g., such as smart electrical outlets, smart lighting fixtures, and so forth).

As shown, a positional tag device 108 may communicate with one or more other components within system 100. In some embodiments, positional tag device 108 may be associated with a companion device (e.g., a client station 106) and additionally be capable of communicating with one or more additional devices (e.g., other client stations 106, wireless nodes 107, AP 112). In some embodiments, communication with the companion device may be via one or more access technologies/protocols, such as BLUETOOTH™ (and/or BLUETOOTH™ (BT) Low Energy (BLE)), Wi-Fi peer-to-peer (e.g., Wi-Fi Direct, Neighbor Awareness Networking (NAN), and so forth), millimeter wave (mmWave) (e.g., 60 GHz, such as 802.11 ad/ay), as well as any of various proprietary protocols (e.g., via wideband or ultra-wideband (UWB) and/or low and/or ultra-low power (LP/ULP) wireless communication). In some embodiments, communication with additional devices may be via BT/BLE as well as one or more other short-range peer-to-peer wireless communication techniques (e.g., various near-field communication (NFC) techniques, RFID, NAN, Wi-Fi Direct, UWB, LT/ULP, and so forth). In some embodiments, positional tag device 108 may be capable of updating a server with a current location (e.g., determined by tag device 108 and/or provided to tag device 108 from another device) via the one or more additional devices as well as via the companion device.

Figure 2A:
FIG. 2A illustrates an example of wireless devices communicating, according to some embodiments.
Figure 2B:
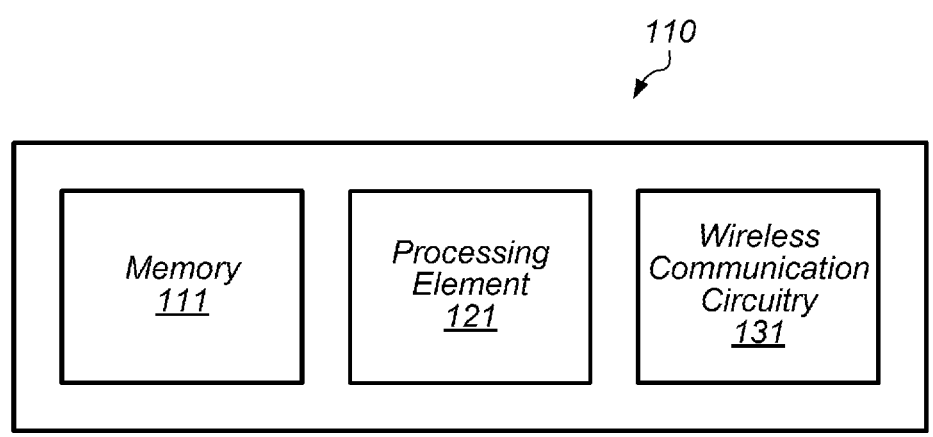
FIG. 2B illustrates an example simplified block diagram of a wireless device, according to some embodiments.

FIGS. 2A-2B—Wireless Communication System

FIG. 2A illustrates an exemplary (and simplified) wireless communication system in which aspects of this disclosure may be implemented. It is noted that the system of FIG. 2A is merely one example of a possible system, and embodiments of this disclosure may be implemented in any of various systems, as desired.

As shown, the exemplary wireless communication system includes a ("first") wireless device 105 in communication with another ("second") wireless device 108. The first wireless device 105 and the second wireless device 108 may communicate wirelessly using any of a variety of wireless communication techniques.

As one possibility, the first wireless device 105 and the second wireless device 108 may perform communication using wireless local area networking (WLAN) communication technology (e.g., IEEE 802.11/Wi-Fi based communication) and/or techniques based on WLAN wireless communication. One or both of the wireless device 105 and the wireless device 108 may also (or alternatively) be capable of communicating via one or more additional wireless communication protocols, such as any of BLUETOOTH™ (BT), BLUETOOTH™ Low Energy (BLE), near field communication (NFC), RFID, UWB, LP/ULP, GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 105 and 108 may be any of a variety of types of wireless device. As one possibility, wireless device 105 may be a substantially portable wireless user equipment (UE) device, such as a smart phone, hand-held device, a laptop computer, a wearable device (such as a smart watch), a tablet, a motor vehicle, or virtually any type of wireless device. As another possibility, wireless device 105 may be a substantially stationary device, such as a payment kiosk/payment device, point of sale (POS) terminal, set top box, media player (e.g., an audio or audiovisual device), gaming console, desktop computer, appliance, door, access point, base station, or any of a variety of other types of device. The wireless device 108 may be a positional tag device, e.g., in a stand-alone form factor, associated with, attached to, and/or otherwise integrated into another computing device, and/or associated with, attached to, and/or integrated into a personal article or device (e.g., a wallet, a backpack, luggage, a briefcase, a purse, a key ring/chain, personal identification, and so forth) and/or a commercial article (e.g., a shipping container, shipping/storage pallet, an item of inventory, a vehicle, and so forth).

Each of the wireless devices 105 and 108 may include wireless communication circuitry configured to facilitate the performance of wireless communication, which may include various digital and/or analog radio frequency (RF) components, one or more processors configured to execute program instructions stored in memory, one or more programmable hardware elements such as a field-programmable gate array (FPGA), a programmable logic device (PLD), an application specific IC (ASIC), and/or any of various other components. The wireless device 105 and/or the wireless device 108 may perform any of the method embodiments or operations described herein, or any portion of any of the method embodiments or operations described herein, using any or all of such components.

Each of the wireless devices 105 and 108 may include one or more antennas and corresponding radio frequency front-end circuitry for communicating using one or more wireless communication protocols. In some cases, one or more parts of a receive and/or transmit chain may be shared between multiple wireless communication standards; for example, a device might be configured to communicate using BT/BLE or Wi-Fi using partially or entirely shared wireless communication circuitry (e.g., using a shared radio or one or more shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components that are shared between multiple wireless communication protocols, and one or more radios or radio components that are used exclusively by a single wireless communication protocol. For example, a device might include a shared radio for communicating using one or more of LTE, CDMA2000 1×RTT, GSM, and/or 5G NR, and one or more separate radios for communicating using Wi-Fi and/or BT/BLE. Other configurations are also possible.

As previously noted, aspects of this disclosure may be implemented in conjunction with the wireless communication system of FIG. 2A. For example, a wireless device (e.g., either of wireless devices 105 or 108) may be configured to implement (and/or assist in implementation of) the methods described herein.

FIG. 2B illustrates an exemplary wireless device 110 (e.g., corresponding to wireless devices 105 and/or 108) that may be configured for use in conjunction with various aspects of the present disclosure. The device 110 may be any of a variety of types of device and may be configured to perform any of a variety of types of functionality. The device 110 may be a substantially portable device or may be a substantially stationary device, potentially including any of a variety of types of device. The device 110 may be configured to perform any of the techniques or features illustrated and/or described herein, including with respect to any or all of the Figures.

As shown, the device 110 may include a processing element 121. The processing element may include or be coupled to one or more memory elements. For example, the device 110 may include one or more memory media (e.g., memory 111), which may include any of a variety of types of memory and may serve any of a variety of functions. For example, memory 111 could be RAM serving as a system memory for processing element 121. Additionally or alternatively, memory 111 could be ROM serving as a configuration memory for device 110. Other types and functions of memory are also possible.

Additionally, the device 110 may include wireless communication circuitry 131. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 131 may include its own processing element(s) (e.g., a baseband processor), e.g., in addition to the processing element 121. For example, the processing element 121 may be an 'application processor' whose primary function may be to support application layer operations in the device 110, while the wireless communication circuitry 131 may be a 'baseband processor' whose primary function may be to support baseband layer operations (e.g., to facilitate wireless communication between the device 110 and other devices) in the device 110. In other words, in some cases the device 110 may include multiple processing elements (e.g., may be a multi-processor device). Other configurations (e.g., instead of or in addition to an application processor/baseband processor configuration) utilizing a multi-processor architecture are also possible.

The device 110 may additionally include any of a variety of other components (not shown) for implementing device functionality, depending on the intended functionality of the device 110, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 110, such as processing element 121, memory 111, and wireless communication circuitry 131, may be operatively (or communicatively) coupled via one or more interconnection interfaces, which may include any of a variety of types of interface, possibly including a combination of multiple types of interfaces. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 121, peripheral interfaces for communication with peripheral components within or external to device 110, etc.) may also be provided as part of device 110.

Figure 2C:
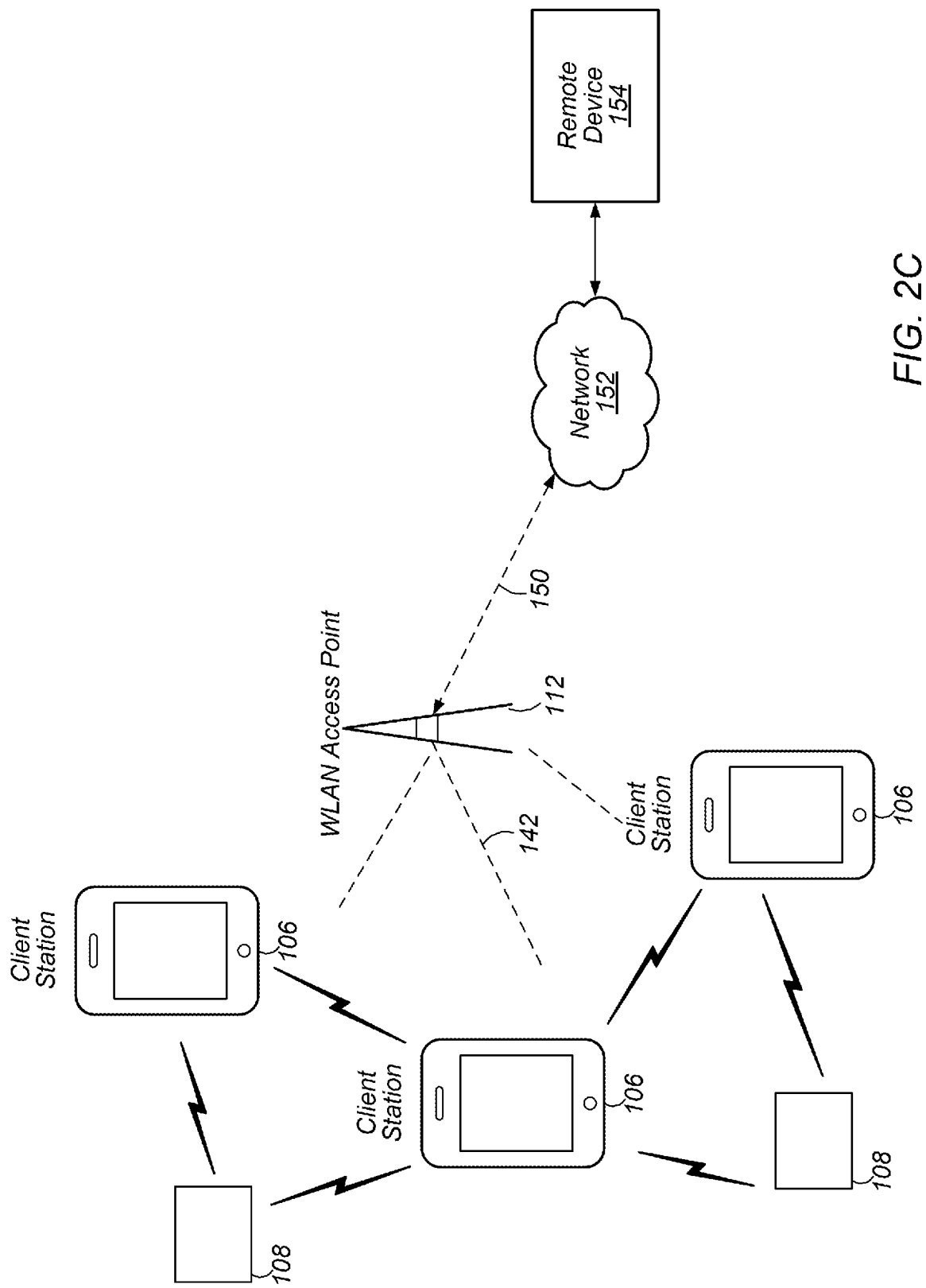
FIG. 2C illustrates an example WLAN communication system, according to some embodiments.

FIG. 2C—WLAN System

FIG. 2C illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. In some embodiments, the AP 112 may be a Wi-Fi access point. The AP 112 may communicate via wired and/or wireless communication channel(s) 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, such as positional tag devices 108, without use of the access point 112.

Further, in some embodiments, as further described below, a wireless device 106 (which may be an exemplary implementation of device 110) may be configured to perform (and/or assist in performance of) the methods described herein.

Figure 3A:
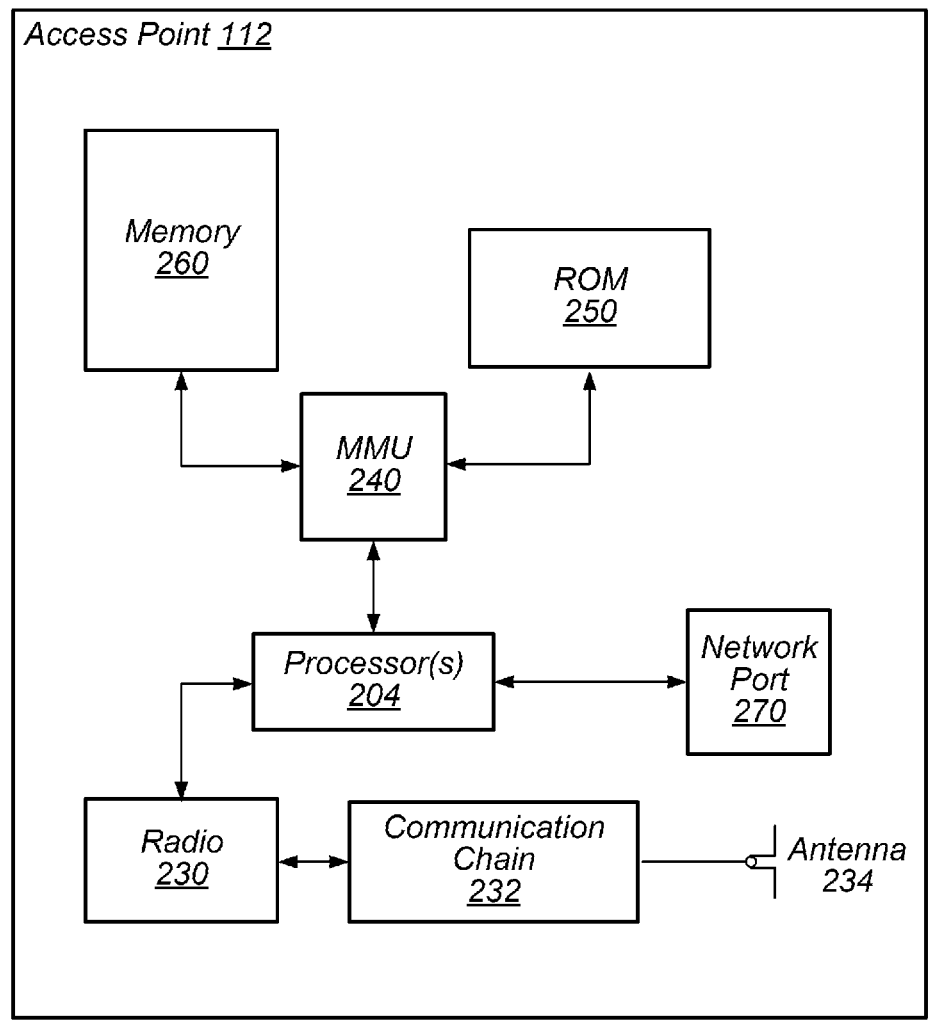
FIG. 3A illustrates an example simplified block diagram of a WLAN Access Point (AP), according to some embodiments.

FIG. 3A—Access Point Block Diagram

FIG. 3A illustrates an exemplary block diagram of an access point (AP) 112, which may be one possible exemplary implementation of the device 110 illustrated in FIG. 2B. It is noted that the block diagram of the AP of FIG. 3A is only one example of a possible system. As shown, the AP 112 may include processor(s) 204, which may execute program instructions for the AP 112. The processor(s) 204 may also be coupled (directly or indirectly) to memory management unit (MMU) 240, which may be configured to receive addresses from the processor(s) 204 and to translate those addresses into locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to one or more additional networks, such as the Internet.

The AP 112 may include at least one antenna 234 and wireless communication circuitry 230, which may be configured to operate as a wireless transceiver and may be further configured to communicate with mobile device 106 (as well as positional tag device 108). The antenna 234 communicates with the wireless communication circuitry 230 via communication chain 232. Communication chain 232 may include one or more receive chains and/or one or more transmit chains. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, BT/BLE, UWB, and/or LP/ULP. Further, in some embodiments, the wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform (and/or assist in performance of) the methods described herein.

Figure 3B:
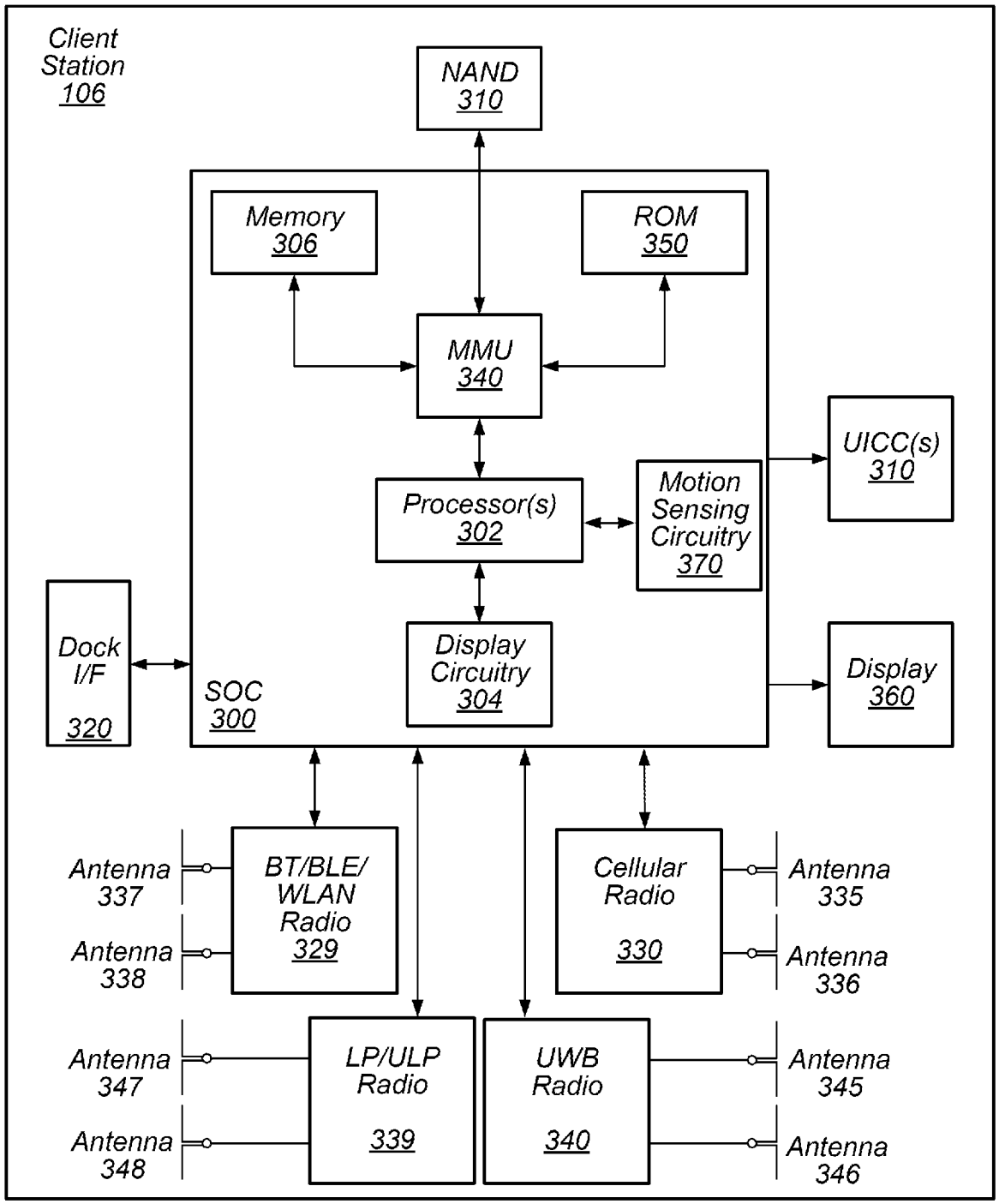
FIG. 3B illustrates an example simplified block diagram of a wireless station (UE), according to some embodiments.

FIG. 3B—Client Station Block Diagram

FIG. 3B illustrates an example simplified block diagram of a client station 106, which may be one possible exemplary implementation of the device 110 illustrated in FIG. 2B. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., short to medium range wireless communication circuitry 329 (e.g., Bluetooth™ and WLAN circuitry), low power/ultra-low power (LP/ULP) radio 339, and ultra-wideband radio 341. The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. LP/ULP radio 339 may couple to one or more antennas, such as antennas 347 and 348 as shown. Additionally, UWB radio 341 may couple to one or more antennas, such as antennas 345 and 346. Alternatively, the radios may share one or more antennas in addition to, or instead of, coupling to respective antennas or respective sets of antennas. Any or all of the radios may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The SOC 300 may also include motion sensing circuitry 370, which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses into locations in memory (e.g., memory 306, read only memory (ROM) 350, NAND flash memory 310) and/or to other circuits or devices, such as the display circuitry 304, cellular communication circuitry 330, short range wireless communication circuitry 329, LP/ULP communication circuitry 339, UWB communication circuitry 341, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations and/or one or more positional tag devices 108. The client station 106 may be configured to communicate according to a WLAN RAT for communication in a WLAN network, such as that shown in FIG. 2C. Further, in some embodiments, as further described below, client station 106 may be configured to perform (and/or assist in performance of) the methods described herein.

As described herein, the client station 106 may include hardware and/or software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 329, 330, 335, 336, 337, 338, 339, 340, 341, 345, 346, 347, 348, 350, and/or 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. Thus, each of cellular communication circuitry 330 and short-range wireless communication circuitry 329 may include one or more integrated circuits (ICs) configured to perform the functions of cellular communication circuitry 330 and short-range wireless communication circuitry 329, respectively.

Figure 3C:
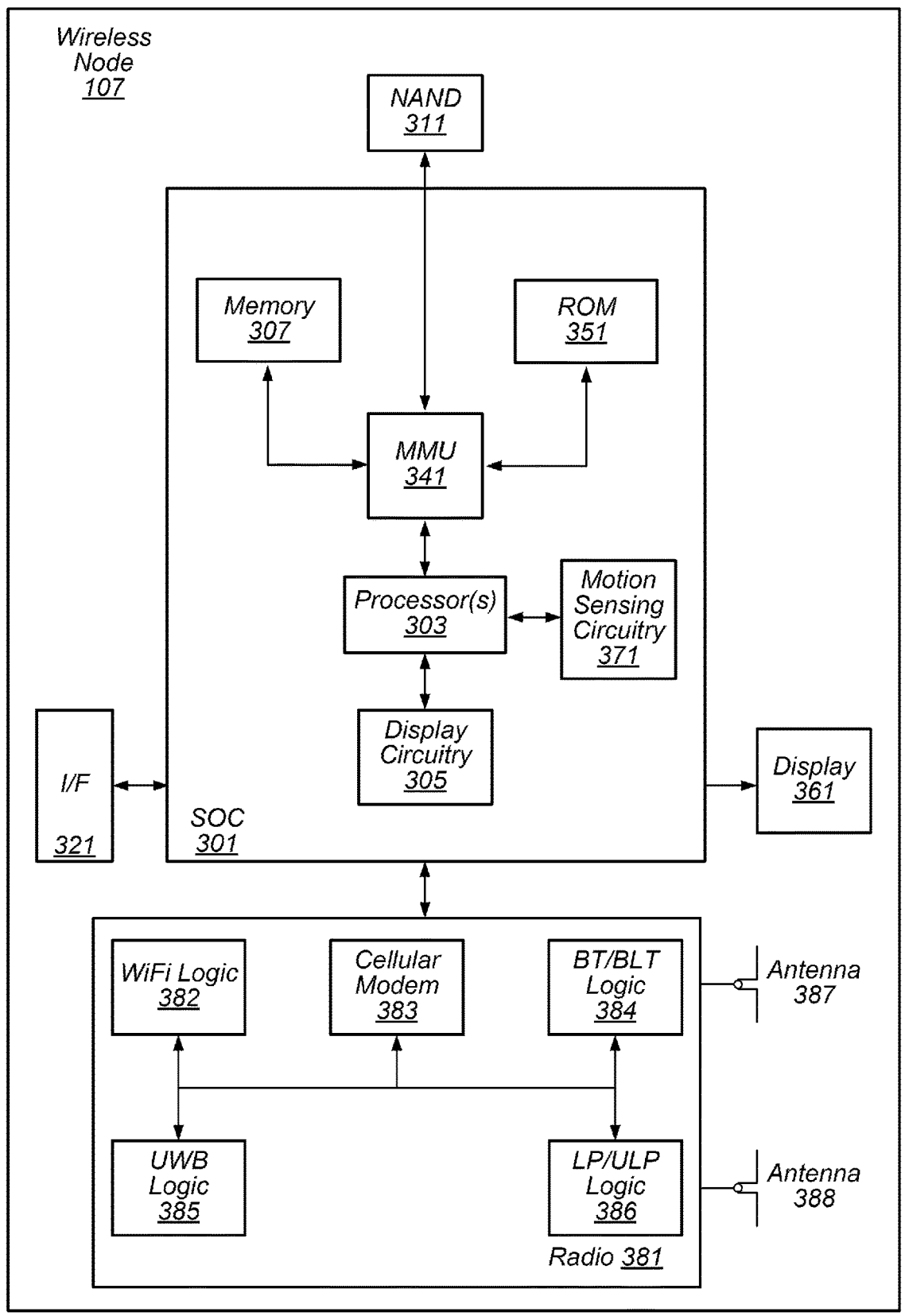
FIG. 3C illustrates an example simplified block diagram of a wireless node, according to some embodiments.

FIG. 3C—Wireless Node Block Diagram

FIG. 3C illustrates one possible block diagram of a wireless node 107, which may be one possible exemplary implementation of the device 110 illustrated in FIG. 2B. As shown, the wireless node 107 may include a system on chip (SOC) 301, which may include portions for various purposes. For example, as shown, the SOC 301 may include processor(s) 303 which may execute program instructions for the wireless node 107, and display circuitry 305 which may perform graphics processing and provide display signals to the display 361. The SOC 301 may also include motion sensing circuitry 371 which may detect motion of the wireless node 107, for example using a gyroscope, accelerometer, and/or any of various other motion sensing components. The processor(s) 303 may also be coupled to memory management unit (MMU) 341, which may be configured to receive addresses from the processor(s) 303 and translate those addresses to locations in memory (e.g., memory 307, read only memory (ROM) 351, flash memory 311). The MMU 341 may be configured to perform memory protection and page table translation or set up. In some embodiments, the MMU 341 may be included as a portion of the processor (s) 303.

As shown, the SOC 301 may be coupled to various other circuits of the wireless node 107. For example, the wireless node 107 may include various types of memory (e.g., including NAND flash 311), a connector interface 321 (e.g., for coupling to a computer system, dock, charging station, etc.), the display 361, and wireless communication circuitry (radio) 381 (e.g., for LTE, LTE-A, CDMA2000, Bluetooth, Wi-Fi, NFC, GPS, UWB, LP/ULP, etc.).

The wireless node 107 may include at least one antenna, and in some embodiments, multiple antennas 387 and 388, for performing wireless communication with base stations and/or other devices. For example, the wireless node 107 may use antennas 387 and 388 to perform the wireless communication. As noted above, the wireless node 107 may in some embodiments be configured to communicate wirelessly using a plurality of wireless communication standards or radio access technologies (RATs).

The wireless communication circuitry (radio) 381 may include Wi-Fi Logic 382, a Cellular Modem 383, BT/BLE Logic 384, UWB logic 385, and LP/ULP logic 386. The Wi-Fi Logic 382 is for enabling the wireless node 107 to perform Wi-Fi communications, e.g., on an 802.11 network and/or via peer-to-peer communications (e.g., NAN). The BT/BLE Logic 384 is for enabling the wireless node 107 to perform Bluetooth communications. The cellular modem 383 may be capable of performing cellular communication according to one or more cellular communication technologies. The UWB logic 385 is for enabling the wireless node 107 to perform UWB communications. The LP/ULP logic 386 is for enabling the wireless node 107 to perform LP/ULP communications. Some or all components of the wireless communication circuitry 381 may be used for communications with a positional tag device 108.

As described herein, wireless node 107 may include hardware and software components for implementing embodiments of this disclosure. For example, one or more components of the wireless communication circuitry 381 of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit). For example, in some embodiments, as further described below, wireless node 107 may be configured to perform (and/or assist in the performance of) the methods described herein.

Figure 4:
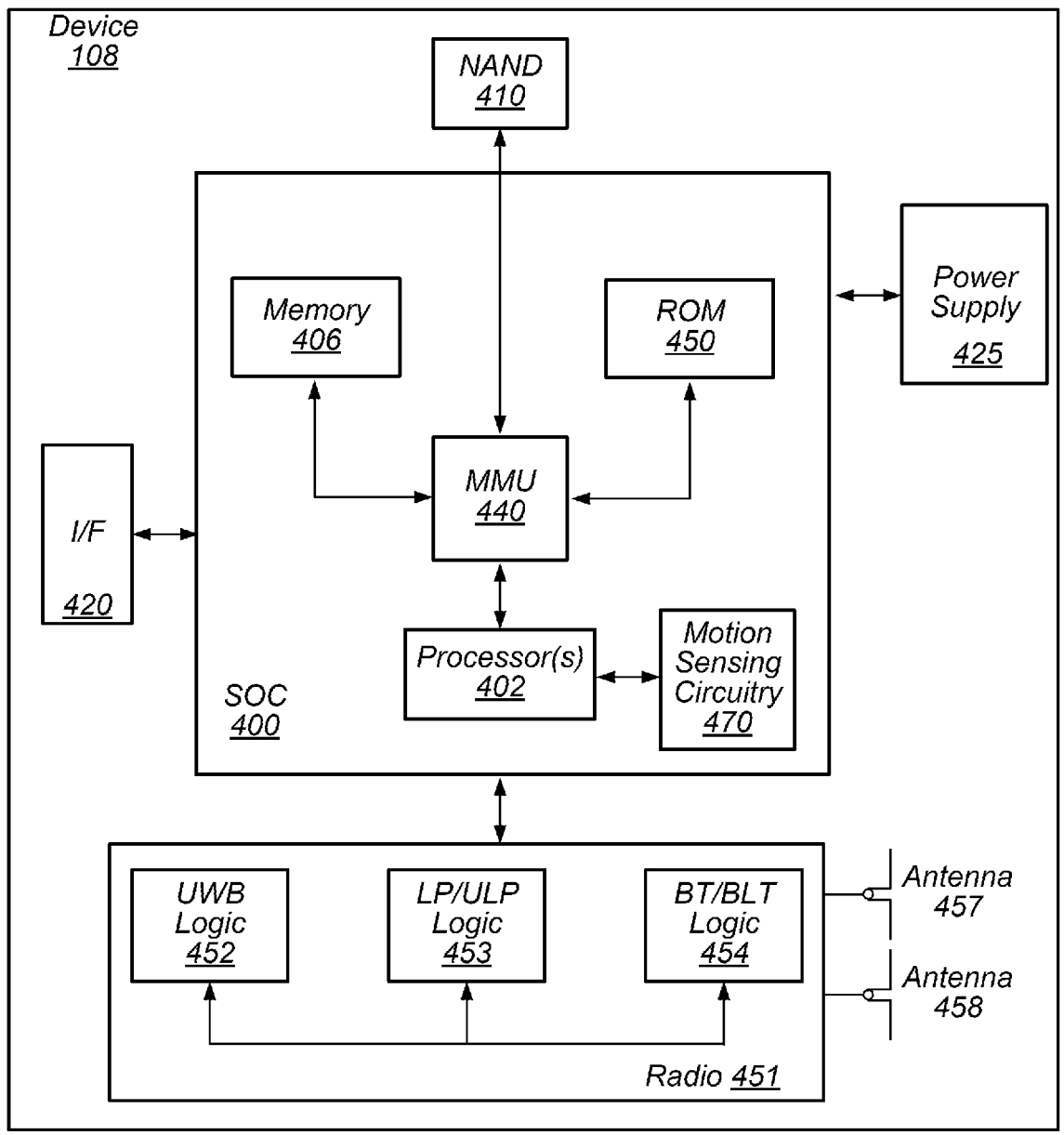
FIG. 4 illustrates an example simplified block diagram of a positional tag device, according to some embodiments.

FIG. 4: Positional Tag Device

FIG. 4 illustrates an example simplified block diagram of a positional tag device 108, which may be one possible exemplary implementation of the device 110 illustrated in FIG. 2B. According to embodiments, positional tag device 108 may include a system on chip (SOC) 400, which may include one or more portions for performing one or more purposes (or functions or operations). The SOC 400 may be coupled to one or more other circuits of the positional tag device 108. For example, the positional tag device 108 may include various types of memory (e.g., including NAND flash 410), a connector interface (I/F) 420 (e.g., for coupling to a computer system, dock, charging station, light (e.g., for visual output), speaker (e.g., for audible output), etc.), a power supply 425 (which may be non-removable, removable and replaceable, and/or rechargeable), and communication circuitry (radio) 451 (e.g., BT/BLE, WLAN, LP/ULP, UWB).

The positional tag device 108 may include at least one antenna, and in some embodiments, multiple antennas 457 and 458, for performing wireless communication with a companion device (e.g., client station 106, wireless node 107, AP 112, and so forth) as well as other wireless devices (e.g., client station 106, wireless node 107, AP 112, other positional tag devices 108, and so forth). In some embodiments, one or more antennas may be dedicated for use with a single radio and/or radio protocol. In some other embodiments, one or more antennas may be shared across two or more radios and/or radio protocols. The wireless communication circuitry 451 may include any/all of UWB logic 452, LP/ULP logic 453, and/or BT/BLE logic 454. In some embodiments, wireless communication circuitry may optionally include logic for any other protocol(s), such as Wi-Fi logic and/or a cellular (e.g., License Assisted Access (LAA)) logic. The BT/BLE logic 454 is for enabling the positional tag device 108 to perform Bluetooth communications. The UWB logic 452 is for enabling the positional tag device 108 to perform UWB communications. The LP/ULP logic 453 is for enabling the positional tag device 108 to perform LP/ULP communications. In some embodiments, the wireless communication circuitry 451 may include multiple receive chains and/or multiple transmit chains for receiving and/or transmitting multiple spatial streams, such as in a multiple-input multiple output (MIMO) configuration. The UWB logic 452, LP/ULP logic 453, and BT/BLE logic 454 each may be independently configured to perform unidirectional or bidirectional communication.

As shown, the SOC 400 may include processor(s) 402, which may execute program instructions for the positional tag device 108. The SOC 400 may also include motion sensing circuitry 470, which may be configured to detect motion of the positional tag device 108, for example using a gyroscope, accelerometer, and/or any of various other motion sensing components. In some embodiments, a GPS receiver and associated circuitry may be used in addition to or in place of other motion sensing circuitry. The processor(s) 402 may also be coupled (directly or indirectly) to memory management unit (MMU) 440, which may be configured to receive addresses from the processor(s) 402 and translate those addresses into locations in memory (e.g., memory 406, read only memory (ROM) 450, NAND flash memory 410) and/or to other circuits or devices, such as the wireless communication circuitry 451. The MMU 440 may be configured to perform memory protection and page table translation or set up. In some embodiments, the MMU 440 may be included as a portion of the processor(s) 402.

As noted above, the positional tag device 108 may be configured to communicate wirelessly with one or more neighboring wireless devices. In some embodiments, as further described below, positional tag device 108 may be configured to perform (and/or assist in the performance of) the methods described herein.

Positional Tag Power Management

Figure 5:
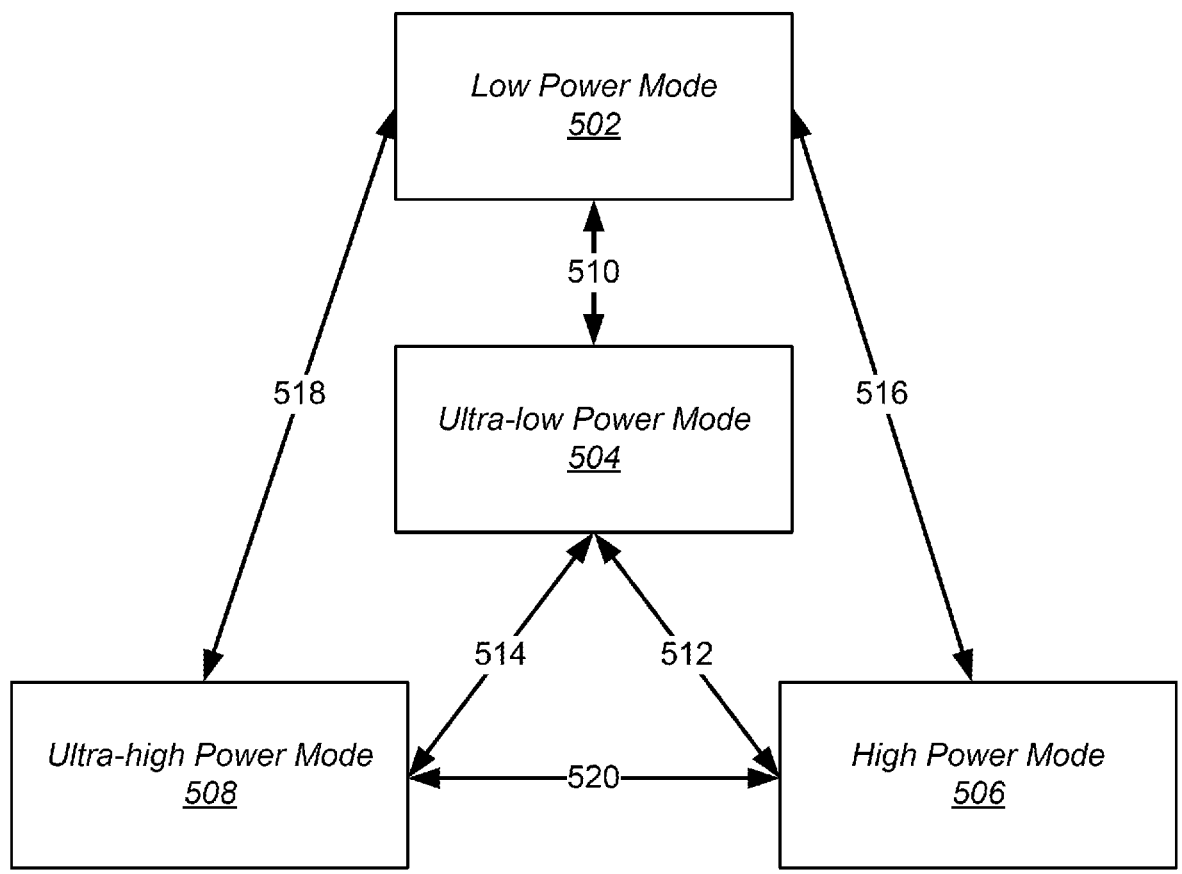
FIG. 5 illustrates an exemplary state diagram for various power modes of a multi-interface transponder (MIT) device, according to some embodiments.

In some embodiments, a multi-interface transponder (MIT) device, such as positional tag device 108, may include multiple power levels and/or power modes. For example, FIG. 5 illustrates an exemplary state diagram for various power modes of an MIT device, according to some embodiments. As shown, the MIT device may operate in any of various power modes, such as a low power mode 502, an ultra-low power mode 504, a high power mode 506, and/or an ultra-high power mode 508. Further, as shown, the MIT device may transition (or switch) between any of the various modes. The transition between modes can be based on any factor or combination of factors, including one or more received signals, sensor data, timing data, environmental data, activity data, location data, etc. Also, the MIT device can be configured to transition from a present mode directly to any other available mode. However, in some implementations, a transition may include a succession through one or more intervening modes. For example, the MIT device may transition between low power mode 502 and any of ultra-low power mode 504 (e.g., via transition 510), higher power mode 506 (e.g., via transition 516), and/or ultra-high power mode 508 (e.g., via transition 518). As another example, the MIT device may transition between ultra-low power mode 504 and any of low power mode 502 (e.g., via transition 510), higher power mode 506 (e.g., via transition 512), and/or ultra-high power mode 508 (e.g., via transition 514). Similarly, the MIT device may transition between high power mode 506 and any of low power mode 502 (e.g., via transition 516), ultra-low power mode 504 (e.g., via transition 512), and/or ultra-high power mode 508 (e.g., via transition 520). Additionally, the MIT device may transition between ultra-high power mode 508 and any of low power mode 502 (e.g., via transition 518), ultra-low power mode 504 (e.g., via transition 514), and/or high power mode 506 (e.g., via transition 520).

In some embodiments, the ultra-low power mode 504 may be associated with an LP/ULP interface and/or LP/ULP logic, e.g., as described above in reference to positional tag device 108. In some embodiments, the MIT device may remain in the ultra-low power mode 504 until a triggering event. In some embodiments, the triggering event may cause the MIT device to transition to a higher power mode of operation (e.g., any of low power mode 508, high power mode 504, and/or ultra-high power mode 508).

In some embodiments, the triggering event may be a received signal/beacon from a neighboring device. In some embodiments, the wake-up signal/beacon may be specific to the MIT device or may be a generic signal/beacon, e.g., that is applicable to a set of MIT devices or to all MIT devices. In other words, the MIT device may receive a wake-up signal/beacon from a neighboring device that intends to wake-up the MIT device or the MIT device may receive a wake-up signal/beacon from a neighboring device that intends to wake-up any MIT device (or any of a certain type(s) of MIT device) within reception range of the wake-up signal/beacon. In some embodiments, the wake-up signal may be received via LP/ULP communications. In some embodiments, the wake-up signal may be received by an ultra-low power radio, e.g., via ULP/LP communications with the neighboring wireless device. In some embodiments, the wake-up signal/beacon may cause the MIT device to transition to a higher power mode of operation (e.g., any of low power mode 502, high power mode 504, and/or ultra-high power mode 508). In some embodiments, transition from the ultra-low power mode 504 may be slowed (or delayed) based, at least in part, on one or more factors, such as current location zone of the MIT device and/or movement of a companion device.

For example, if the MIT device determines that its current location is within a safe zone (e.g., such as user's home, a user's work, a user's car, and/or a frequent location, such as a friend's or relative's home), the MIT device may delay, or may not invoke, a transition to a higher power mode. As another example, if the MIT device determines that a movement of a companion device is similar to a movement of the MIT device, the MIT device may determine a constant motion state and delay, or may not invoke, a transition to a higher power state.

Conversely, in some embodiments, transition from the ultra-low power mode 504 may be accelerated based, at least in part, on one or more factors, such as a current location or location zone of the MIT device, and/or a current transport mode. For example, if the MIT device determines (or is notified) that a transportation transition is occurring or is about to occur (e.g., exiting a train, airplane, ferry, taxi and/or boarding a train, airplane, ferry, taxi), the MIT device may accelerate the transition to a higher power mode (e.g., implement the transition even in the absence of another trigger, such as separation from a companion device).

In some embodiments, the triggering event may be the sensing of movement by the MIT device. For example, the MIT device may monitor movement, e.g., via motion sensing circuitry, and transition from the ultra-low power mode 504 to a higher power mode based, at least in part, on movement of the MIT device. In some embodiments, the triggering event may be based, at least in part, on an elapsed time between location updates of the MIT device. In some embodiments, the elapsed time between location updates may be based, at least in part, on a location mode of the MIT device (e.g., safe zone mode, danger zone mode, lost mode, and so forth).

For example, based on the triggering event, the MIT device may transition to the low power mode 502 and begin to transmit beacons and/or scan for beacons at a first rate over a low power interface. In some embodiments, the periodicity of beacon transmissions may be approximately 1 to 2 seconds. In some other embodiments, the periodicity of beacon transmissions may be less than 1 second, 1-5 seconds, or more than 5 seconds. In some embodiments, the beacons may be transmitted via a BLE interface or via BLE logic. In some embodiments, a transmission power of the beacons may be based, at least in part, on a location mode of the MIT device and/or an elapsed time since the last location update. For example, in a safe zone mode, the MIT device may transmit beacons less frequently upon wake-up and at a lower power level as compared to a danger zone mode, in which the MIT device may transmit beacons more frequently upon wake-up and/or at a higher power level. In some embodiments, the MIT device may transition back to the ultra-low power mode 504 upon an acknowledgment of an updated location. In some embodiments, the MIT device may transition to one of high power mode 506 and/or ultra-high power mode 508 depending on various criteria (e.g., detection of entrance into a danger zone, instruction received from companion device, movement detection, increasing separation from a companion device, and so forth), prior to transitioning to ultra-low power mode 504.

As another example, based on the triggering event, the MIT device may transition to the high power mode 506 and begin to transmit and/or receive beacons at a second rate over a low power interface. In some embodiments, the periodicity of beacon transmissions may be approximately 1 to 10 milliseconds. In some other embodiments, the periodicity may be less than 1 millisecond, tens of milliseconds, or hundreds of milliseconds. In some embodiments, the beacons may be transmitted via a BLE interface or via BLE logic. In some embodiments, a transmission power of the beacons may be based, at least in part, on a location mode of the MIT device and/or an elapsed time since last location update. For example, in a safe zone mode, the MIT device may transmit beacons less frequently upon wake-up and/or at a lower power level, as compared to a danger zone mode, in which the MIT device may transmit beacons more frequently upon wake-up and/or at a higher power level. In some embodiments, the MIT device may transition back to the ultra-low power mode 504 upon an acknowledgment of updated location. In some embodiments, the MIT device may transition to one of low power mode 502 and/or ultra-high power mode 508, depending on various criteria (e.g., detection of entrance into a danger zone, instruction received from a companion device, movement detection, separation from a companion device, and so forth), prior to transitioning to ultra-low power mode 504.

As a further example, the MIT device may transition to the ultra-high power mode 508 and begin to transmit beacons at a first rate over a high power interface. In some embodiments, the beacons may be transmitted via a UWB interface or via UWB logic. In some embodiments, the ultra-high power mode 508 may be initiated when a companion device is seeking (e.g., attempting to precisely locate) the MIT device. In some embodiments, the MIT device may transition back to the ultra-low power mode 504 upon an acknowledgment of updated location. In some embodiments, the MIT device may transition to one of low power mode 502 and/or ultra-high power mode 508 depending on various criteria (e.g., detection of entrance into a danger zone, instruction received from companion device, movement detection, and so forth), prior to transitioning to ultra-low power mode 504.

Figure 6A:
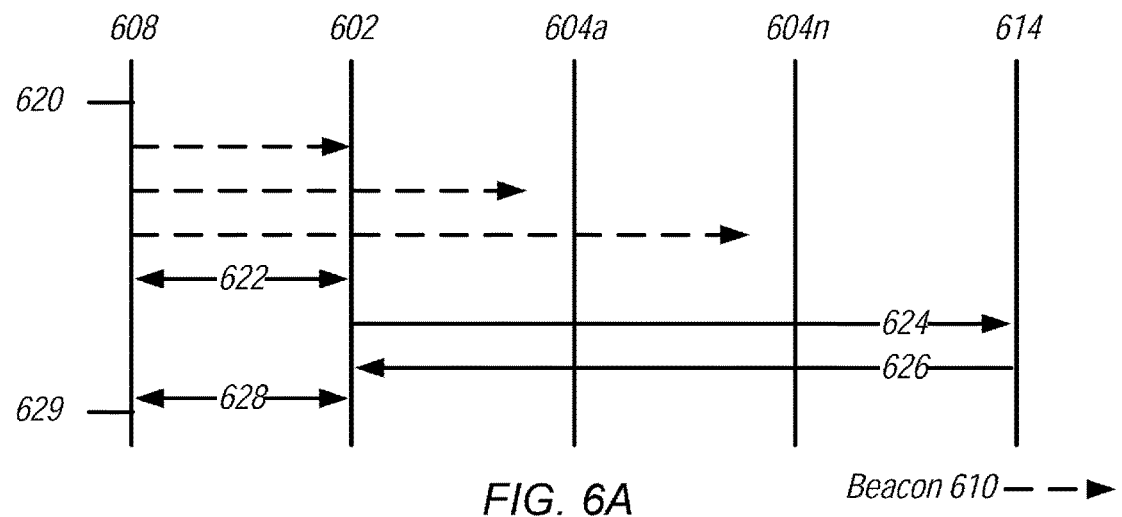
FIGS. 6A-6C illustrate examples of an MIT device updating location via neighboring devices, according to some embodiments.
Figure 6B:
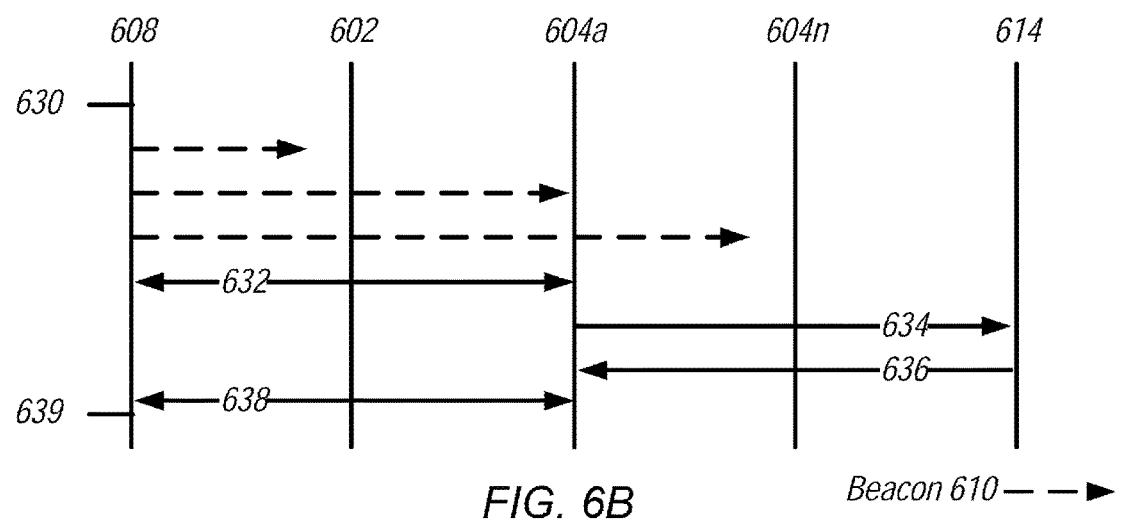
Figure 6C:
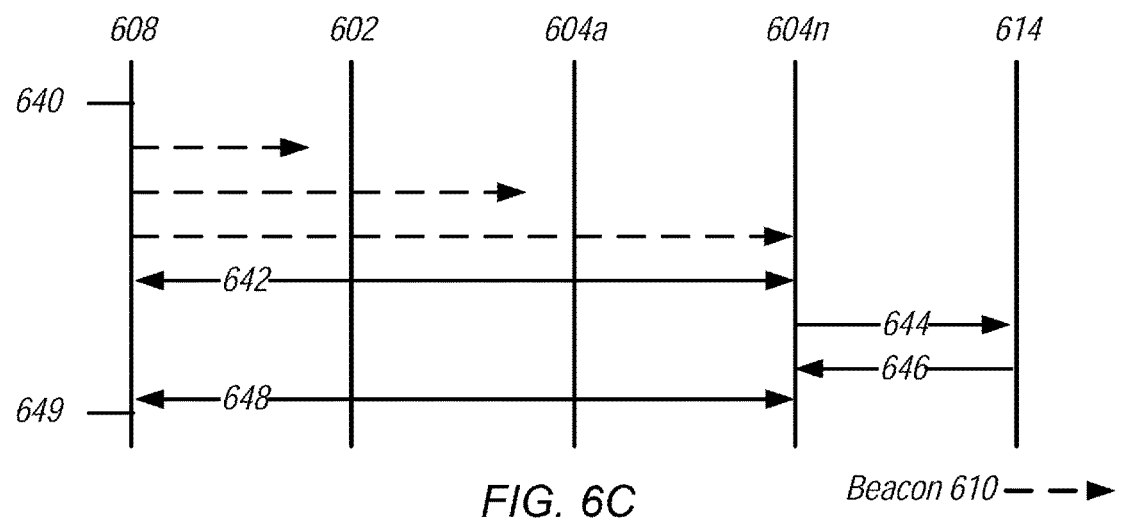

FIGS. 6A-6C illustrate examples of an MIT device updating location via neighboring devices, according to some embodiments. As shown, an MIT device 608 may be within range of one or more neighboring devices, such as companion (or trusted) device 602 (e.g., a device that is associated with the MIT device, such as a device used to register the MIT device with a location server, such as location server 614) and/or non-companion devices 604a and 604n (e.g., a device associated with a location server, such as location server 614, but not a device associated with the MIT device). The MIT device 608 may detect/sense a triggering event, such as triggering events 620, 630, or 640. In response to the triggering event, the MIT device 608 may transition from an ultra-low power mode of operation to a higher power mode of operation and begin to transmit beacons/signals 610. Note that the periodicity, power, and type of beacon/signal transmitted by the MIT device 608 may be based, at least in part, on a power mode of the MIT device. Thus, in some embodiments, beacons/signals 610 may be lower power beacons/signals (e.g., BLE beacons/signals) transmitted at a low rate (e.g., approximately every 1 to 2 seconds), lower power beacons/signals transmitted at a high rate (e.g., approximately every 1 to 10 milliseconds), and/or higher power beacons/signals (e.g., UWB beacons/signals).

For example, as illustrated by FIG. 6A, after triggering event 620, MIT device 608 may transmit one or more beacons 610. At least one of the beacons 610 may be received by a companion device 602. Upon receipt of the at least one beacon 610, companion device 602 may exchange communications 622 with the MIT device 608. Based on the communications 622, companion device 602 may update a location server 614 with an updated location of MIT device 608 via communications 624 and 626. In some embodiments, the communications 624 and 626 may be conveyed via push notification connection with location server 614. Once the location server 614 has confirmed the updated location of MIT device 608, the companion device 602 may exchange one or more confirmation messages 628 with MIT device 608. At 629, MIT device 608 may transition back to an ultra-low power mode and/or to one or more other power modes, e.g., as described above.

As another example, as illustrated by FIG. 6B, after triggering event 630, MIT device 608 may transmit one or more beacons 610. At least one of the beacons 610 may be received by a non-companion device 604a. Upon receipt of the at least one beacon 610, non-companion device 604a may exchange communications 632 with the MIT device 608. Based on the communications 632, non-companion device 604a may update a location server 614 with an updated location of MIT device 608 via communications 634 and 636. In some embodiments, the communications 634 and 636 may be conveyed via push notification connection with location server 614. Once the location server 614 has confirmed the updated location of MIT device 608, the non-companion device 604a may exchange one or more confirmation messages 638 with MIT device 608. At 639, MIT device 608 may transition back to an ultra-low power mode and/or to one or more other power modes, e.g., as described above.

As a further example, as illustrated by FIG. 6C, after triggering event 640, MIT device 608 may transmit one or more beacons 610. At least one of the beacons 610 may be received by a non-companion device 604n. Upon receipt of the at least one beacon 610, non-companion device 604n may exchange communications 642 with the MIT device 608. Based on the communications 642, non-companion device 604n may update a location server 614 with an updated location of MIT device 608 via communications 644 and 646. In some embodiments, the communications 644 and 646 may be conveyed via push notification connection with location server 614. Once the location server 614 has confirmed the updated location of MIT device 608, the non-companion device 604n may exchange one or more confirmation messages 648 with MIT device 608. At 649, MIT device 608 may transition back to an ultra-low power mode and/or to one or more other power modes, e.g., as described above.

Figure 7:
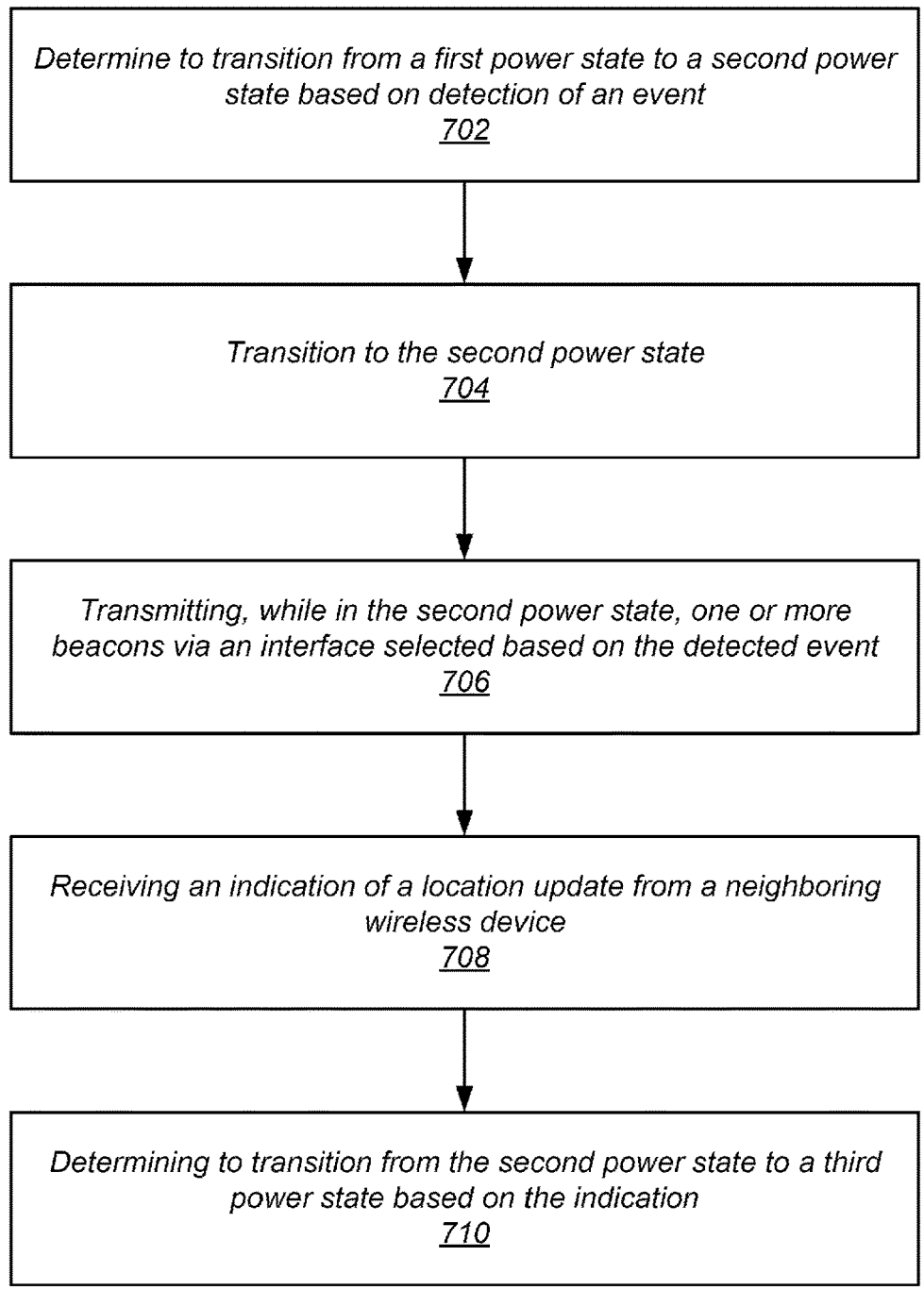
FIG. 7 illustrates a block diagram of an example of a method for power management of a MIT device, according to some embodiments.

FIG. 7 illustrates a block diagram of an example method for power management of a multi-interface transponder (MIT) device, according to some embodiments. The method shown in FIG. 7 may be used in conjunction with any of the systems or devices shown in the Figures, among other devices. In various embodiments, some of the method elements shown may be performed concurrently, in a different order than shown, or may be omitted. Additional method elements may also be performed as desired. As shown, this method may operate as follows.

At 702, an MIT device may determine, while in a first power state, to transition to a second power state based, at least in part, on detection of an event. In some embodiments, the event may be detectable via an interface, e.g., a first interface, and/or sensing circuitry, e.g., motion sensing circuitry, of the MIT device. For example, in some embodiments, the event may include receiving (from a companion device, such as client station 106 and/or wireless node 107) a wakeup indication via the first interface. In some embodiments, the first interface may be an ultra-low power radio frequency (RF) interface (e.g., such as a wake-up radio and/or wake-up receiver). In some embodiments, the event may include detecting movement (and/or a change in movement) of the MIT device, e.g., greater than a threshold. Note that in some embodiments, the MIT device may ignore movement detected by the motion circuitry, e.g., if a companion device indicates that the movement is associated with a mode of transportation.

At 704, the MIT device may transition to the second power state. In some embodiments, transitioning to the second power state may include activating a second interface of the MIT device. In some embodiments, the second interface may be one of a Bluetooth interface and/or ultra-wideband (UWB) interface. In some embodiments, the MIT device may determine which interface to activate based, at least in part, on the detected event.

At 706, the MIT device, while in the second power state, may transmit one or more beacons via a selected interface based, at least in part, on the detected event. For example, when the event includes receiving a wakeup indication, the wakeup indication may include instructions to activate a specific interface. Additionally, in some embodiments, the instructions may include one or more transmission intervals and/or transmission powers. For example, the instructions may indicate activation of a Bluetooth interface. Additionally, the instructions may indicate a transmission rate (e.g., lower rate, on the order of every one to two seconds, or a higher rate, e.g., on the order of every one to 10 milliseconds). Further, the instructions may indicate a transmission power (e.g., based on congestion). As another example, the instructions may indicate activation of an ultra-wideband interface as well as associated transmission frequency and/or transmission power information.

At 708, the MIT device, while in the second power state, may receive an indication of a location update from a neighboring wireless device. In some embodiments, the neighboring wireless device may be a companion device (e.g., a device with a secure connection/secure relationship with the MIT device). In some embodiments, the companion device may be a wireless station, such as wireless station 106. In some embodiments, the companion device may a wireless node, such as wireless node 107. Note that a companion device may also include a device that assisted the MIT device in registration with a location server. In some embodiments, the companion device may support multiple MIT devices. In some embodiments, the neighboring wireless device may be a non-companion device (e.g., a device without a secure connection/secure relationship with the MIT device) associated with the location server. For example, the non-companion device may be in communication with the location server and may be configured to update locations of MIT devices not associated with the non-companion device. Thus, the non-companion device may assist with updating the location of the MIT device, e.g., when (or if) the MIT device is separated from (out of communication rage of) the companion device.

At 710, the MIT device may transition from the second power state to a third power state based, at least in part, on the indication. For example, in some embodiments, the indication may cause (or instruct) the MIT device to transition back to an ultra-low power state (e.g., such as ultra-low power mode 504). Alternatively, the indication may cause (or instruct) the MIT device to transition from a low transmission rate to a higher transmission rate (e.g., from a low power state, such as low power mode 502, to a higher power state, such as high power mode 506). In some embodiments, the indication may cause activation and/or deactivation of another interface. For example, the second power state may include activation of a Bluetooth interface and transition to a third power state may cause activation of the ultra-wideband interface. Further, in some implementations, transition to the third power state may cause de-activation of the Bluetooth interface. As another example, the second power state may include activation of a Bluetooth or ultra-wideband interface and transition to the third power state may include de-activation of the activated interface.

In some embodiments, power management of a multi-interface transponder (MIT) device, such as device 108, may be based, at least in part, on a geographic location zone and/or location mode, of the MIT device. For example, the MIT device may alter a power mode based, at least in part, on determining that the MIT device is lost, e.g., separated from a companion device for more than a specified period of time. As another example, the MIT device may alter a power mode based, at least in part, on determining that the MIT device is in (or within) a danger zone, e.g., during a transition in transportation mode, such as a train stopping, a car stopping, a plane landing, a ferry docking, and so forth. As yet another example, the MIT device may consider multiple factors, such as companion and location factors, with respect to altering a power mode. As still another example, the MIT device may alter a power mode based, at least in part, on determining that the MIT device is in (or within) a safe zone, e.g., within a user's home, an often-visited location of the user (such as a friend's or relative's home, a place of work, and so forth).

Figure 8A:
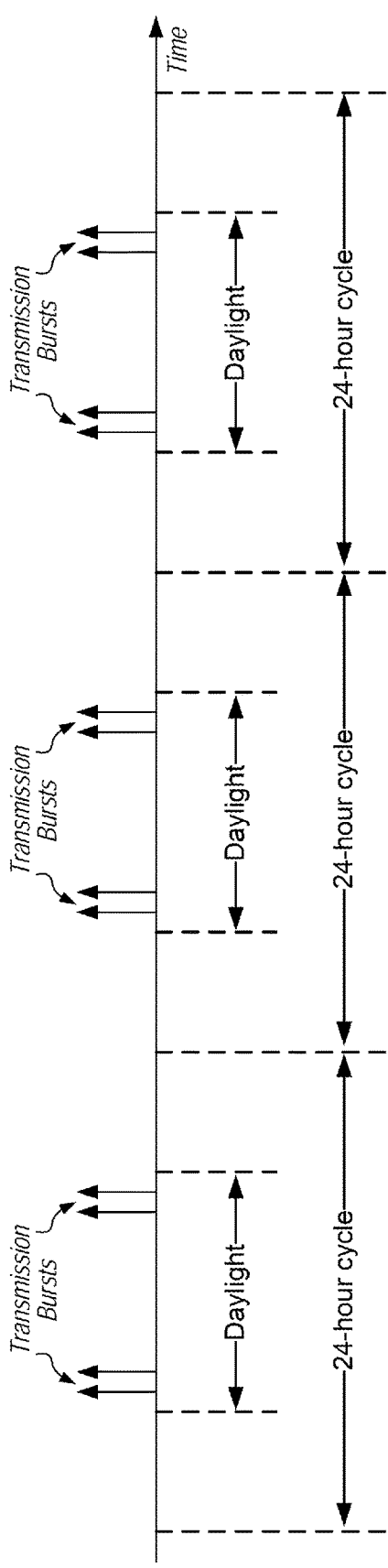
FIG. 8A illustrates an example of transmission cycles of a multi-interface transponder (MIT) device, according to some embodiments.
Figure 8B:
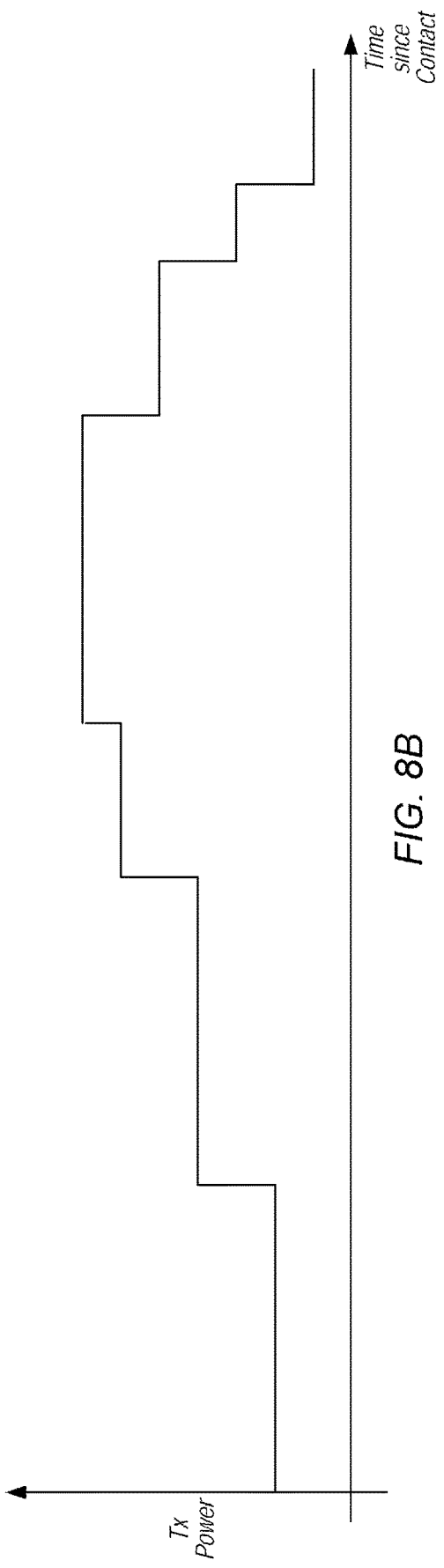
FIG. 8B illustrates an example of transmission power adjustments as a function of time since last location update, according to some embodiments.

For example, in some embodiments, a multi-interface transponder (MIT) device, e.g., such as positional tag device 108, may determine that it is lost, e.g., based on a duration of time since a last communication with a companion device. In some embodiments, the determination may be further based, at least in part, on a duration of time since a location update and/or receipt of a signal from a device associated with a location server. In such instances, the MIT device may transition to a power state (or power mode) associated with a lost mode of operation. In some embodiments, operating in the lost mode may include the MIT device altering and/or adjusting transmission power and/or transmission rates to further conserve battery power and increase the probability of discovery. For example, transmission rate may be based, at least in part, on time of day as illustrated by FIG. 8A. As shown, the MIT device may transmit beacons at a higher rate during portions of daylight, e.g., when it may be more likely to encounter a neighboring device. In addition, in some embodiments, the MIT device may cluster sets of transmissions (e.g., transmission burst) within a short time frame while spending a majority of a 24-hour cycle not transmitting (e.g., sleeping) to further conserve battery power. As another example, as illustrated by FIG. 8B, the MIT device may adjust transmission power, based, at least in part, on the duration of time since receipt of a signal from a device associated with a location server. For example, the MIT device may increase transmission power (e.g., to increase transmission range) as the duration of time increases and/or during portions of daylight. In some embodiments, the increase in transmission power may be offset by a decrease in transmission periodicity and/or transmission cycles to maintain battery power, e.g., as illustrated by FIG. 8A. Further, in some embodiments, the transmission power may be incrementally increased as the duration of time (e.g., since the last location update) increases, as shown in FIG. 8B. In some embodiments, after a time period, the transmission power may be incrementally reduced to further conserve battery power. Note that as the time period (time since last contact) increases, transmission decisions (e.g., transmission rate, transmission frequency, transmission power, and so forth) by the MIT device may be altered to prolong the battery life of the MIT device. In other words, when the time period is within the range of hours, the MIT device may adopt a different transmission pattern (e.g., most aggressive transmission patterns, less regard for battery conservation) as compared to when the period is within the range of days (aggressive transmission patterns, but some regard for battery conservation) or weeks (less aggressive transmission patterns, more regard for battery longevity), or even months (most aggressive battery conservation, highly conservative transmission patterns).

Figure 9:
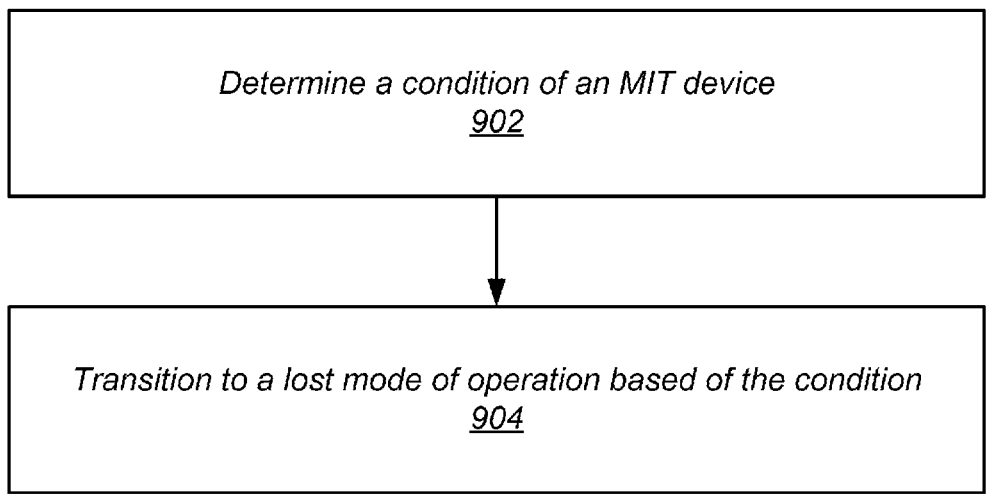
FIG. 9 illustrates a block diagram of an example of a method for power management of an MIT device based on a detected condition, according to some embodiments.

FIG. 9 illustrates a block diagram of another example of a method for power management of a multi-interface transponder (MIT) device, according to some embodiments. The method shown in FIG. 9 may be used in conjunction with any of the systems or devices shown in the Figures, among other devices. In various embodiments, some of the method elements shown may be performed concurrently, in a different order than shown, or may be omitted. Additional method elements may also be performed as desired. As shown, this method may operate as follows.

At 902, an MIT device, such as device 108, may determine a condition of the MIT device. In some embodiments, the condition may be based, at least in part, on a duration of time since communication with a companion device. In some embodiments, the condition may be further based, at least in part, on a duration of time since the MIT device received an indication that a location associated with the MIT device has been updated at a location server. In some embodiments, the condition may be further based, at least in part, on a duration of time since the MIT device has received a signal from a neighboring wireless device, e.g., such as a wireless station 106, a wireless node 107, and/or an AP 112. In some embodiments, the condition may be associated with a determination that the MIT device is lost (e.g., separated from a companion device).

At 904, the MIT device may transition to a first mode of operation based, at least in part, on the condition. In some embodiments, the mode of operation may be associated with a lost mode of operation and may be configured to extend an operating life of the MIT device. For example, in some embodiments, the first mode of operation may include long portions of power conservation (e.g., sleep) followed by short bursts of beacon transmissions. In other words, the MIT device may transmit beacons over a first interface (such as a Bluetooth interface) at a high rate for a first portion of time (e.g., a first portion of a 24-hour period) and spend the remaining portion of time in a power conservation state. In some embodiments, the first portion of time may at least partially correspond to daylight hours (e.g., as sensed by a light sensor of the MIT device or corresponding to a time kept by the MIT device) to increase the probability of discovery. In some embodiments, the MIT device may, as the duration of time since the last location update increases, increase transmit power in order to increase discovery range. Note that in some embodiments, since increasing transmit power adversely effects power consumption, the MIT device may mitigate the increased power consumption by decreasing a number of beacons transmitted within a time period. Further, in some embodiments, the MIT device may vary a frequency of transmissions (or cluster of transmissions) in an attempt to discover a neighboring wireless device.

As another example, the MIT device may alter a power mode based, at least in part, on determining that the MIT device is in (or within) a danger zone, e.g., during a transition in transportation mode, such as a train stopping, a car stopping, a plane landing, a ferry docking, and so forth. In some embodiments, a companion device, e.g., such as client station 106 and/or wireless node 107, may determine a transportation mode (e.g., vehicle, plane, train, boat, and so forth). In addition, the companion device may monitor movement for a transition in the transportation mode (e.g., vehicle stopping, plane landing, train slowing, boat docking, and so forth) or location along a route (e.g., approaching a known transition point or destination). Upon detection of a transition in the transportation mode, the companion device may notify the MIT device of the transition or signal a change in mode. In some embodiments, the MIT device may then alter its power mode to transmit at a higher rate and/or with higher transmission power.

For example, referring back to FIG. 5, during transportation, the MIT device may be in the ultra-low power mode 504 and upon notification, may transition to high power mode 506. In some embodiments, the MIT device may activate a Bluetooth interface and transmit beacons at a higher rate (e.g., approximately every 1 to 10 milliseconds). In some embodiments, if a distance between the MIT device and the companion device increases beyond approximately 1 meter (e.g., 2 to 3 feet), an alert or notification (e.g., visual, audible, and/or haptic) may be output from the companion device. Additionally, the companion device may send an instruction to the MIT device to transition to a higher power mode, e.g., to the ultra-high power mode 508 from high power mode 506. In some embodiments, the MIT device may activate an ultra-wide band interface to increase precision of location detection. In some embodiments, the MIT device also may deactivate the Bluetooth interface. Additionally, in areas of greater (e.g., above average) access medium congestion (interference) (e.g., danger zones), the companion device may transmit instructions to supported MIT devices to further increase a location update rate (e.g., in addition to increasing transmission rate and/or transmission power). In some embodiments, the companion device may increase scan window length and/or scan window frequency in order to mitigate increased congestion (and/or interference caused by increased access medium traffic). Note, that in some embodiments, the companion device may support multiple MIT devices. Thus, in some embodiments, the companion device may filter out beacons from non-supported MIT devices.

Figure 10:
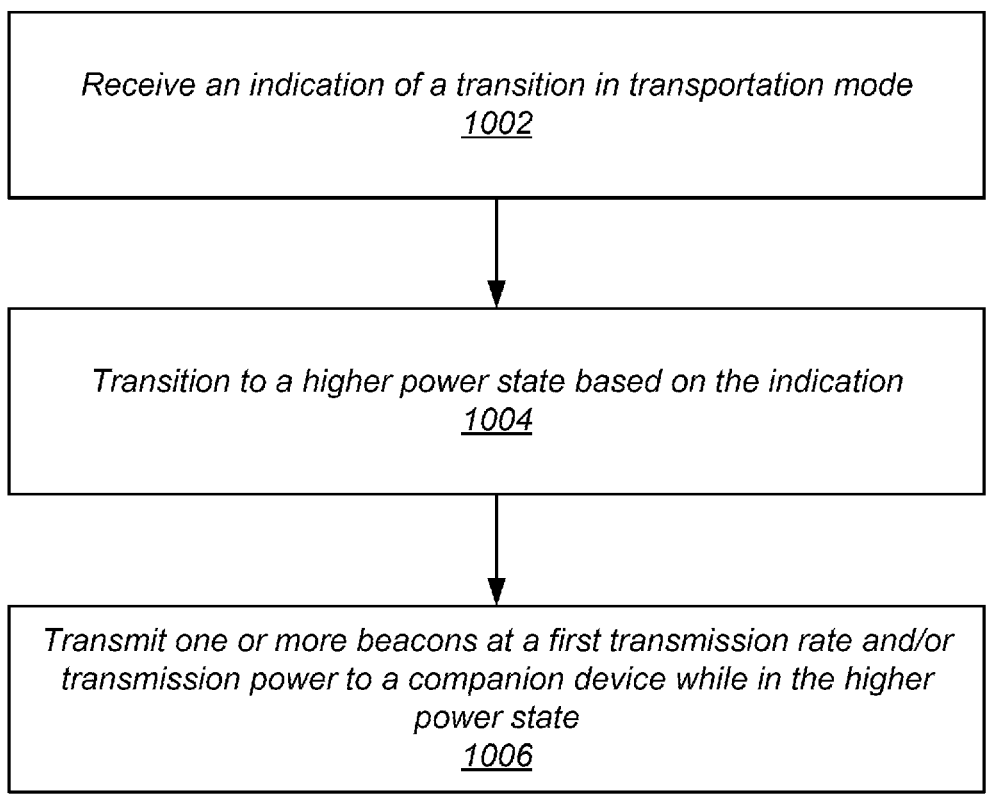
FIG. 10 illustrates a block diagram of an example of a method of power management of an MIT device based on a detection of a transition in transportation mode, according to some embodiments.

FIG. 10 illustrates a block diagram of another example method for power mode switching of a multi-interface transponder (MIT) device based on geographic zone, according to some embodiments. The method shown in FIG. 10 may be used in conjunction with any of the systems or devices shown in the Figures, among other devices. In various embodiments, some of the method elements shown may be performed concurrently, in a different order than shown, or may be omitted. Additional method elements may also be performed as desired. As shown, this method may operate as follows.

At 1002, an MIT device, such as device 108, may receive an indication of a transition in transportation mode. The indication may be received via a first interface and from a companion device. The companion device may be a UE device, such as client station 106, a wearable device, such as wireless node 107, and/or an access point device, such as AP 112. The first interface may correspond to a first power state. Additionally, the first interface may be an ultra-low power radio frequency interface (e.g., such as a wake-up radio and/or wake-up receiver). In some embodiments, the transportation mode may include or indicate at least one conveyance, e.g., a vehicle, a train, a boat, or a plane.

At 1004, the MIT device, in response to the indication, may transition to a second power state. In some embodiments, the second power state may be associated with activation of a second interface. The second interface may consume more power than the first interface. In some embodiments, the second interface may be one of a Bluetooth or an ultra-wideband interface.

At 1006, the MIT device may transmit, via the second interface, one or more beacons at a first transmission rate and at a first transmission power to the companion device. In some embodiments, the MIT device may receive, from the companion device, an indication of an end of the transition in transportation mode. In response, the MIT device may transition back to the first power state. In some instances, the MIT device may receive, from the companion device, an indication that the companion device has moved more than a threshold distance from the MIT device. In response, the MIT device may increase the first transmission rate of the one or more beacons to a second transmission rate. In some embodiments, the threshold distance may be approximately 1 meter (e.g., between 2 and 3 feet). In some embodiments, the MIT device may receive, from the companion device, an indication to increase transmission power. In some embodiments, the indication may be based, at least in part, on determining the presence of a higher level (e.g., above average) of congestion.

In some embodiments, a companion device, such as wireless station 106 and/or wireless node 107, may use a last location of the multi-interface transponder (MIT) device, such as device 108, to aid a user in physically discovering the MIT device, e.g., even when the MIT device is not broadcasting to the companion device. For example, the companion device may send one or more signals to wake up the MIT device and determine a location of the MIT device (relative to the companion device) via ultra-wideband communications. Once the location of the MIT device is determined, the MIT device may discontinue transmissions (e.g., transition to ultra-low power mode 504). For example, a sensor of the MIT device can detect that it has been located, e.g., through motion, etc. In addition, as part of finding the MIT, the companion device may display a map view and/or an augmented reality (AR) view indicating location of the MIT device. In some embodiments, as the companion device is moved, the map view/AR view may be updated based on movement of the companion device. In other words, location of the MIT device relative to the companion device may be updated based, at least in part, on movement of the companion device.

FIGS. 11-14 illustrate block diagrams of examples of methods of MIT operation, according to some embodiments. The methods shown in FIGS. 11-14 may be used in conjunction with any of the systems or devices shown in the Figures, among other devices. In various embodiments, some of the method elements shown may be performed concurrently, in a different order than shown, or may be omitted. Additional method elements may also be performed as desired. As shown, these methods may operate as follows.

Figure 11:
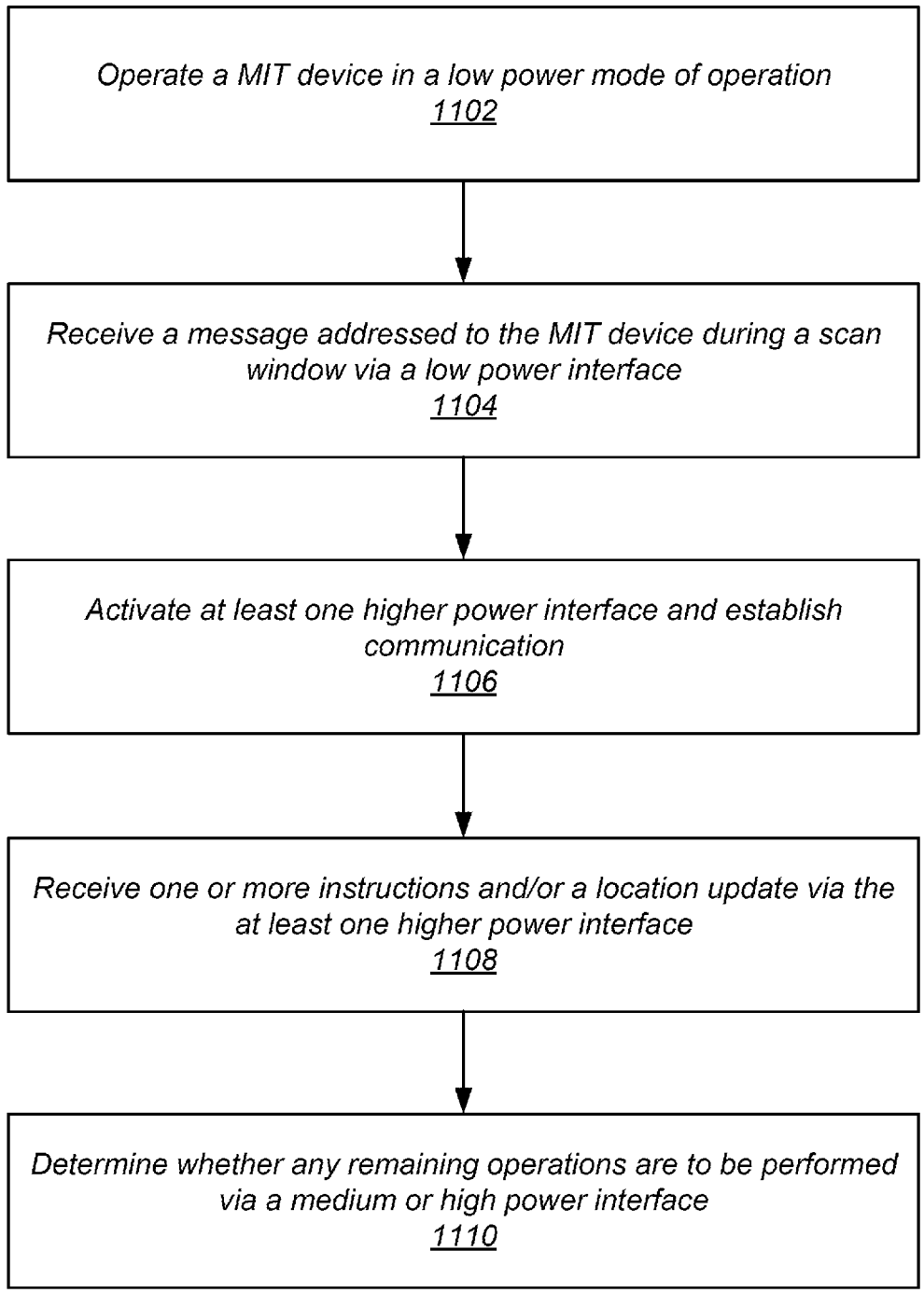
FIGS. 11-14 illustrates block diagrams of examples of methods of MIT device operation, according to some embodiments.

Turning to FIG. 11, at 1102, an MIT device (such as MIT device 108) having any/all of a low power radio interface (e.g., a wake-up radio and/or wake-up receiver), a medium power radio interface (e.g., Bluetooth (BT) and/or Bluetooth Low Energy (BLE)), and/or a high power radio interface (e.g., UWB, 60 GHz) may be in a low power mode of operation (e.g. operating in a low power mode of operation). In the low power mode, the MIT device, via the low power radio interface, may periodically scan for messages (e.g., beacons, polls, probes, etc.) addressed to the MIT device, which may signal the MIT device to activate a higher power radio interface. A message may be received from an associated device (e.g., a paired device or a device associated with the same or a related user account, such as wireless station 106, wireless node 107, and/or AP 112) or from an unassociated device (e.g., a device associated with a different user account). In some embodiments, the MIT device may not transmit regularly (e.g., continuously or periodically) while in the low power mode to conserve battery power. Further, the scan window period (e.g., the width of the window) and interval (e.g., the period between intervals) may be set or may be dynamically adjusted, e.g., in response to one or more factors, such as battery level, congestion/interference, time of day, sensor data, and so forth. Additionally, the MIT device may respond to a message addressed uniquely to the MIT device, addressed to a group (or set) that includes the MIT device, or addressed to all MIT devices. The MIT device also may ignore messages that are not addressed to the MIT device, e.g., such as messages uniquely addressed to a different MIT device or to a group to which the MIT device does not belong.

At 1104, during a scan window, a message addressed to the MIT device may be received from a wireless device via the low power interface. At 1106, in response, the MIT device may activate at least one higher power interface, such as a BT or BLE interface, and may establish communication with the wireless device, e.g., by transmitting a response. At 1108, through the communication, the MIT device can receive updated location information and/or one or more commands, such as a command to activate a high power interface and/or to output one or more signals (e.g., audible, visual, haptic).

At 1110, the MIT device may determine whether any remaining operations are to be performed via a medium or high power interface. If no remaining operations are to be performed, the MIT device may deactivate all interfaces but the low power interface and may resume monitoring through scan windows.

Figure 12:
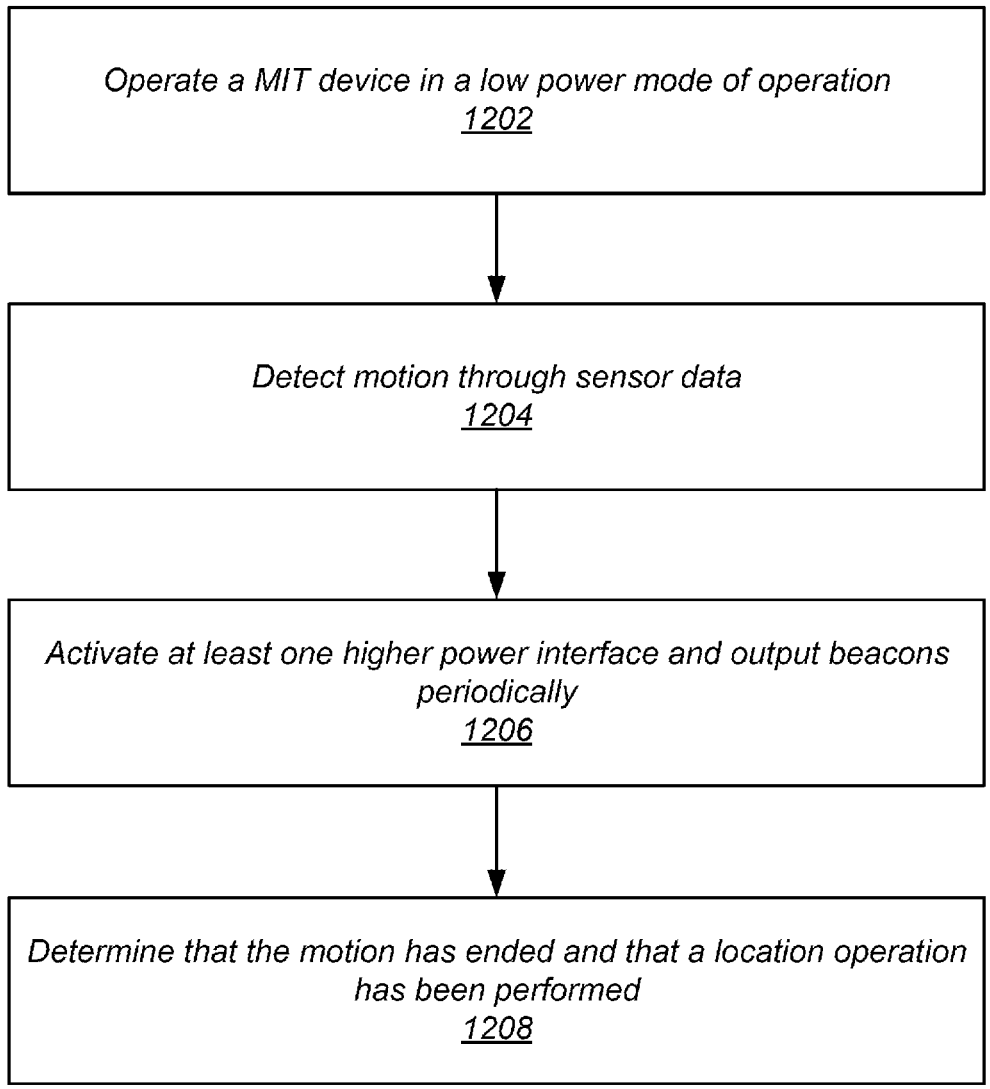

Turning to FIG. 12, at 1202, an MIT device (such as MIT device 108) having any/all of a low power radio interface (e.g., a wake-up radio and/or wake-up receiver), a medium power radio interface (e.g., Bluetooth (BT) and/or Bluetooth Low Energy (BLE)), and/or a high power radio interface (e.g., UWB, 60 GHz) may be in a low power mode of operation (e.g. operating in a low power mode of operation). In the low power mode, the MIT device, via the low power radio interface, may periodically scan for messages (e.g., beacons, polls, probes, etc.) addressed to the MIT device, which may signal the MIT device to activate a higher power radio interface. A message may be received from an associated device (e.g., a paired device or a device associated with the same or a related user account, such as wireless station 106, wireless node 107, and/or AP 112) or from an unassociated device (e.g., a device associated with a different user account). In some embodiments, the MIT device may not transmit regularly (e.g., continuously or periodically) while in the low power mode to conserve battery power. Further, the scan window period (e.g., the width of the window) and interval (e.g., the period between intervals) may be set or may be dynamically adjusted, e.g., in response to one or more factors, such as battery level, congestion/interference, time of day, sensor data, and so forth. Additionally, the MIT device may respond to a message addressed uniquely to the MIT device, addressed to a group (or set) that includes the MIT device, or addressed to all MIT devices. The MIT device also may ignore messages that are not addressed to the MIT device, e.g., such as messages uniquely addressed to a different MIT device or to a group to which the MIT device does not belong.

At 1204, the MIT device can detect motion through sensor data (e.g., from an accelerometer or gyroscope). In some implementations, at 1206, the MIT device can activate another interface (e.g., BT/BLE) in response to the motion and can output beacons periodically. The periodicity and number of beacons can depend on a variety of factors, including location, the type of motion, the duration of the motion, proximity of an associated device, etc.

At 1208, the MIT device can determine that the motion has ended and that the MIT device has performed a location update operation with another device (e.g., an associated device). Thereafter, the MIT device can return to a low power mode and resume monitoring through scan windows.

Figure 13:
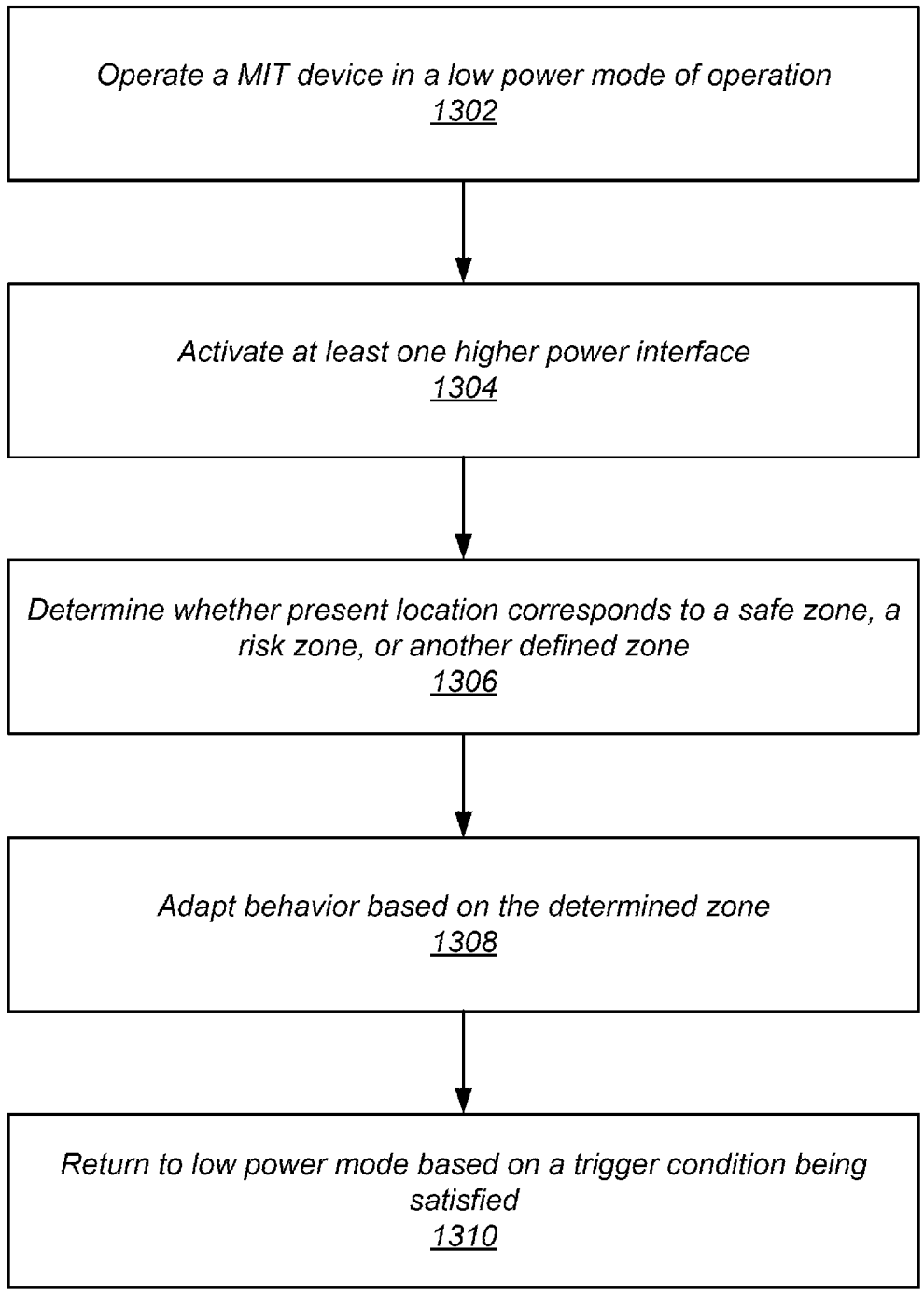

Turning to FIG. 13, at 1302, an MIT device (such as MIT device 108) having any/all of a low power radio interface (e.g., a wake-up radio and/or wake-up receiver), a medium power radio interface (e.g., Bluetooth (BT) and/or Bluetooth Low Energy (BLE)), and/or a high power radio interface (e.g., UWB, 60 GHz) may be in a low power mode of operation (e.g. operating in a low power mode of operation). In the low power mode, the MIT device, via the low power radio interface, may periodically scan for messages (e.g., beacons, polls, probes, etc.) addressed to the MIT device, which may signal the MIT device to activate a higher power radio interface. A message may be received from an associated device (e.g., a paired device or a device associated with the same or a related user account, such as wireless station 106, wireless node 107, and/or AP 112) or from an unassociated device (e.g., a device associated with a different user account). In some embodiments, the MIT device may not transmit regularly (e.g., continuously or periodically) while in the low power mode to conserve battery power. Further, the scan window period (e.g., the width of the window) and interval (e.g., the period between intervals) may be set or may be dynamically adjusted, e.g., in response to one or more factors, such as battery level, congestion/interference, time of day, sensor data, and so forth. Additionally, the MIT device may respond to a message addressed uniquely to the MIT device, addressed to a group (or set) that includes the MIT device, or addressed to all MIT devices. The MIT device also may ignore messages that are not addressed to the MIT device, e.g., such as messages uniquely addressed to a different MIT device or to a group to which the MIT device does not belong.

At 1304, the MIT device may activate at least one higher power interface, e.g., based on detected motion and/or a message received during a scan window. At 1306, the MIT device can determine whether its present location corresponds to a safe zone, a risk zone, or some other defined zone. A zone (or region) can be any bounded or defined space (e.g., a geo-fenced area). At 1308, the MIT device may adapt its behavior based on the determined zone. For example, when the MIT device determines that it is in a safe zone, the MIT device can enter a low power mode and select scan window settings that will allow the MIT device to enhance power conservation. In some implementations, MIT device operating settings can be dynamically adjusted to achieve a target operating duration, such as 6 months, 9 months, 12 months, 18 months, 24 months, 36 months, and so forth. As another example, when the MIT device determines that it is in a risk (or danger) zone, e.g., in a transit scenario, the MIT device can select scan window settings that will allow the MIT device to more quickly identify a message (e.g., longer, more frequent scan windows) and can optionally activate a higher power interface (e.g., BT/BLE) to actively transmit beacons. The risk zone MIT device settings can be maintained until the MIT device determines an exit event, such as leaving a risk zone, entering a safe zone, determining that it is lost (e.g., after no contact has been made with another device for a threshold period of time and/or being located outside of a known zone).

At 1310, the MIT device may return to a low power mode once a trigger condition has been satisfied. For example, after establishing contact with another device, after conducting a successful location update operation, after returning to a safe zone, upon motion stopping, upon detecting an associated device in proximity, etc. the MIT device can return to a lower power mode of operation.

Figure 14:
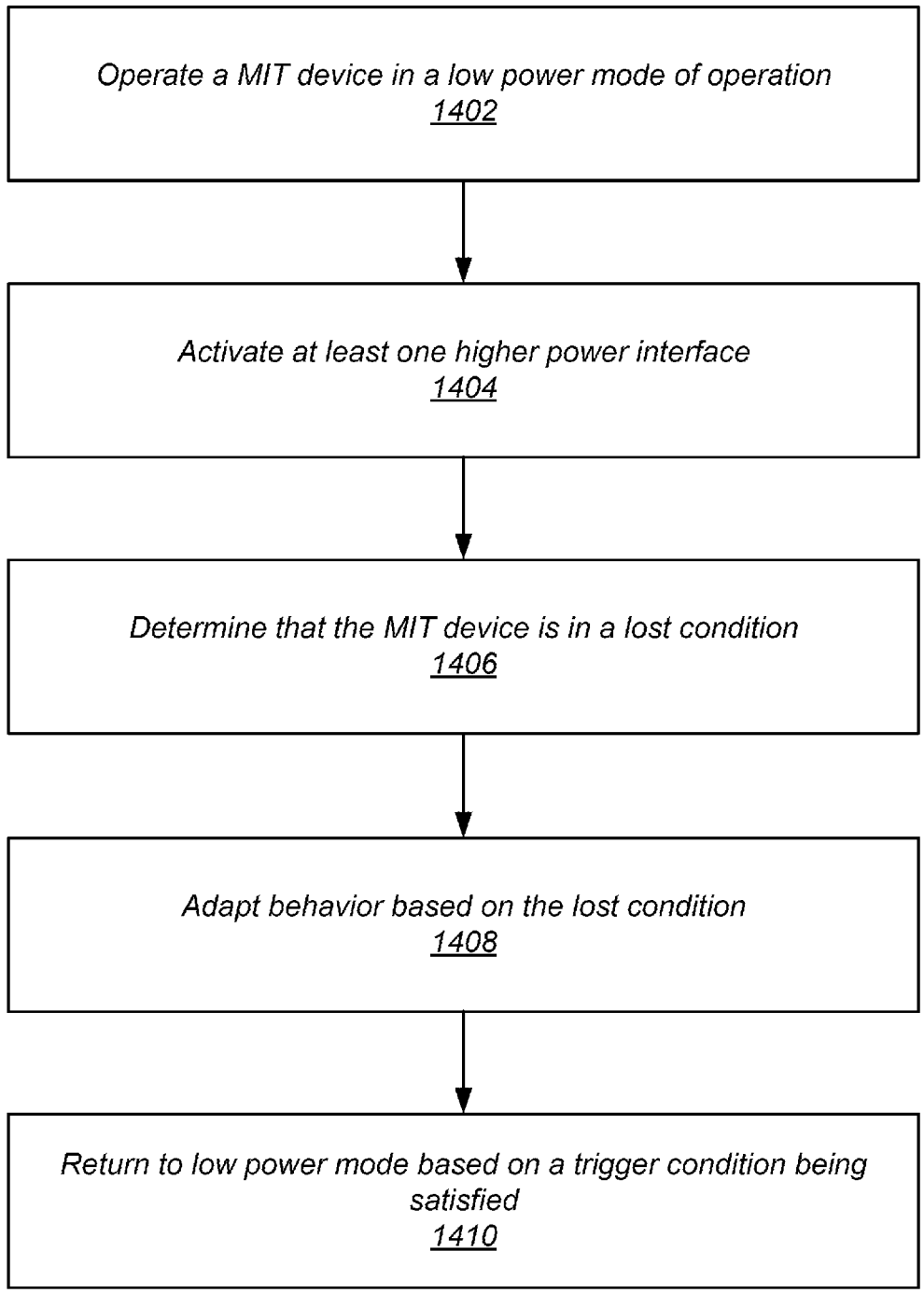

Turning to FIG. 14, at 1402, an MIT device (such as MIT device 108) having any/all of a low power radio interface (e.g., a wake-up radio and/or wake-up receiver), a medium power radio interface (e.g., Bluetooth (BT) and/or Bluetooth Low Energy (BLE)), and/or a high power radio interface (e.g., UWB, 60 GHz) may be in a low power mode of operation (e.g. operating in a low power mode of operation). In the low power mode, the MIT device, via the low power radio interface, may periodically scan for messages (e.g., beacons, polls, probes, etc.) addressed to the MIT device, which may signal the MIT device to activate a higher power radio interface. A message may be received from an associated device (e.g., a paired device or a device associated with the same or a related user account, such as wireless station 106, wireless node 107, and/or AP 112) or from an unassociated device (e.g., a device associated with a different user account). In some embodiments, the MIT device may not transmit regularly (e.g., continuously or periodically) while in the low power mode to conserve battery power. Further, the scan window period (e.g., the width of the window) and interval (e.g., the period between intervals) may be set or may be dynamically adjusted, e.g., in response to one or more factors, such as battery level, congestion/interference, time of day, sensor data, and so forth. Additionally, the MIT device may respond to a message addressed uniquely to the MIT device, addressed to a group (or set) that includes the MIT device, or addressed to all MIT devices. The MIT device also may ignore messages that are not addressed to the MIT device, e.g., such as messages uniquely addressed to a different MIT device or to a group to which the MIT device does not belong.

At 1404, the MIT device may activate at least one higher power interface, e.g., based on detected motion and/or a message received during a scan window. At 1406, the MIT device can determine that it is lost (e.g., in a lost condition). For example, the MIT device can determine that it has not been in contact with another device for more than a threshold duration and/or is located outside of a known zone. At 1408, in response to determining that it is lost, the MIT device can transition to a mode in which at least one higher power interface is periodically activated (e.g., adapt behavior based on the lost condition). For example, the MIT device can activate the medium power interface (e.g., BT/BLE) and can transmit one or more beacons periodically. The beacon period, beacon interval, and number of beacons transmitted can be selected to conserve power, to increase the probability of discovery, or both. Further, the transmit power for one or more beacons can be varied. For example, beacon transmit power can be varied cyclically (e.g., −25 dBm, −10 dBm, 0 dBm, +4 dBm) to cover various ranges. Any number of different transmit power values can be used and the powers shown are only exemplary.

Further, the number and values of transmit power used, as well as the timing, can be varied based on a variety of factors, such as remaining battery power, time of day, amount of light, length of time since last contact with another device, etc. For example, more aggressive beaconing can be performed while sufficient battery power remains (e.g., above 50%, between 50% and 20%, above 10%, etc.). More aggressive beaconing also can be performed at times when people are more likely to be present (e.g., based on the MIT device's clock, an embedded light sensor, detected RF signals, etc.). Similarly, the MIT device can transition to more conservative beaconing, e.g., when battery power falls below a predetermined level, during periods when people are less likely to be present, etc.

At 1410, the MIT device may return to a low power mode once a trigger condition has been satisfied. For example, after establishing contact with another device, after conducting a successful location update operation, after returning to a safe zone, upon motion stopping, upon detecting an associated device in proximity, etc. the MIT device can return to a lower power mode of operation.

Figure 15:
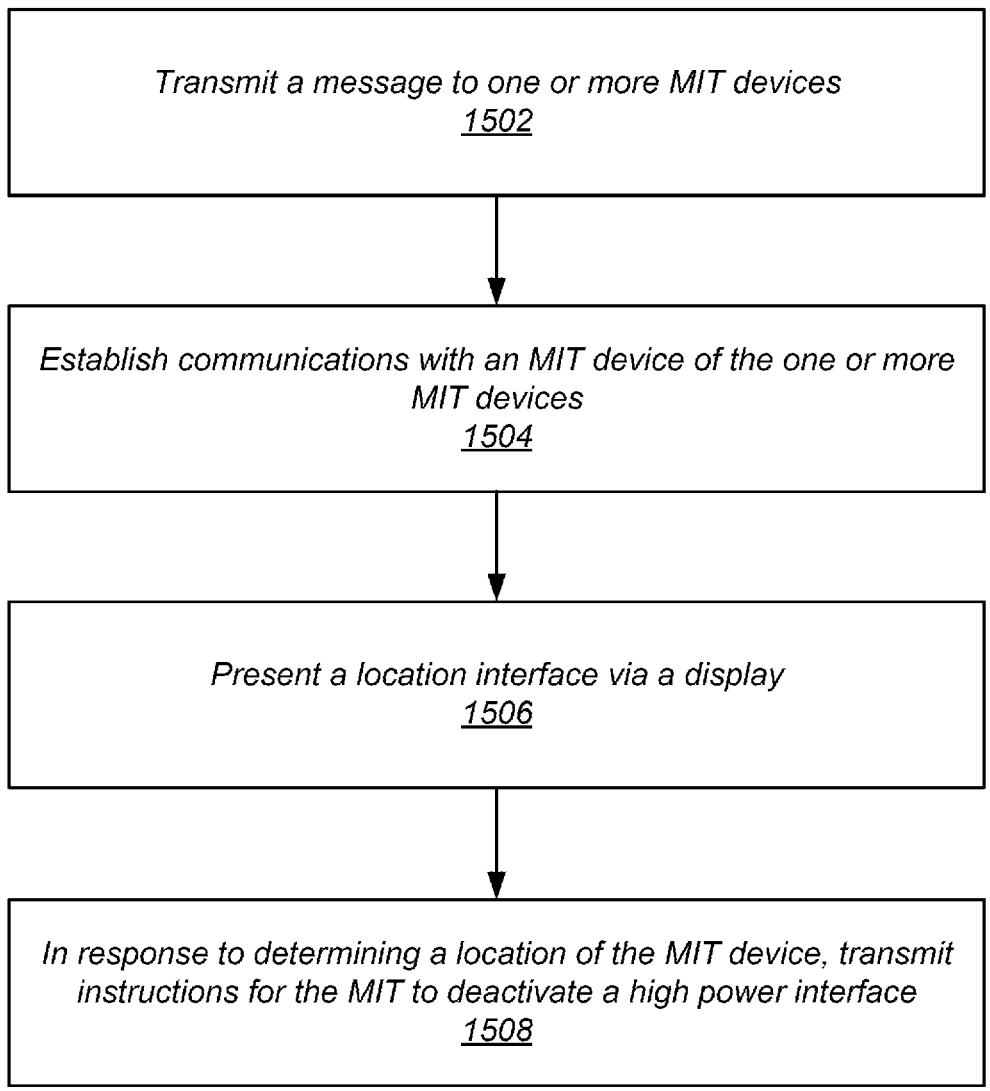
FIG. 15 illustrates a block diagram of an example of a method of scanning for an MIT device, according to some embodiments.

FIG. 15 illustrates an example method of scanning for an MIT device, according to some embodiments. The method shown in FIG. 15 may be used in conjunction with any of the systems or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a wireless device (such as wireless station 106, wireless node 107, and/or AP 112) may transmit a message to one or more MIT devices (or tags, transponders, etc., such as MIT device 108). The wireless device can be associated with one or more of the MIT devices. For example, the device may be a companion device (e.g., a phone or mobile computing device) associated with a user account that also is associated with the one or more MIT devices (a common user account) or previously paired with the MIT device. The wireless device can address the message to a specific MIT device (e.g., associated with an object to be located), a set of MIT devices (e.g., of a common type or linked through an association), or generally to all MIT devices. Further, the message can be transmitted using an interface that can be received by a low-power interface of the MIT device (e.g., a wake-up radio and/or wake-up receiver).

At 1504, wireless device may establish communications with an MIT device of the one or more MIT devices over a medium power interface. Note that in some embodiments, upon receiving the message, the MIT device may activate the medium power (and range) interface, such as a Bluetooth (BT) or BT low-energy (BLE) interface. In some instances, the wireless device can utilize communications over the medium power interface to locate the MIT device. For example, the wireless device can instruct the MIT device to output one or more signals, such as audible signals, visual signals (e.g., a light), and/or haptic signals. Additionally or alternatively, the wireless device and the MIT device can use signal information (e.g., signal strength measurements (RSSI)) to perform the location operation. In other instances, the wireless device may instruct the MIT device to activate a high power interface, such as a UWB interface, to provide more precise location information (e.g., as compared to other methods of determining location of the MIT device). In some embodiments, the wireless device and the MIT device can use a single interface or multiple interfaces for the location operation.

At 1506, the wireless device may present a location interface, e.g., on a display. The location interface can be a live image (e.g., a camera feed) or a rendering (e.g., a map, blank screen, etc.) and may also include one or more location indicators corresponding to the location of the MIT device. For example, one or more arrows, dots, circles, or other such indicators. Further, the one or more location indicators can vary, e.g., in size, color, shape, and/or intensity, to provide further information regarding the location of the MIT device. In some embodiments, the wireless device may only present the location interface when the high power interface is active.

At 1508, once the location of the MIT device has been determined (e.g., through the high power interface), the wireless device may transmit one or more messages instructing the MIT device to deactivate the high power interface, e.g., to reduce battery consumption. Further, the wireless device may instruct the MIT device to deactivate one or more other interfaces and/or to terminate one or more outputs (e.g., audible, visual, haptic). In addition, the instructions may direct the MIT device to return to a lower-power mode of operation, e.g., periodically scanning for a wake-up signal via the low power interface (e.g., wake-up radio and/or wake-up receiver).

MIT Device Use Embodiments

In some embodiments, a multi-interface transponder (MIT) device, such as MIT device 108, may be used as a monetary device, e.g., for money transfer and/or as a payment apparatus. For example, an MIT device may be used to transfer money, acting as a stored-value card or a cash-on-card, such as a prepaid transit card, gift card, or other such card implementation. For example, the MIT device can include a secure processor and/or secure storage in addition to communication circuitry, one or more sensors, processors, memories, a power source, etc. In such embodiments, the MIT device may operate in a stand-alone mode (or as a stand-alone device), e.g., without a companion device. In some embodiments, the MIT device may be associated with an account (e.g., a bank account, such as a credit card, debit card, checking and/or savings account) or monetary pool (e.g., such as a pre-funded account hosted by a service, but not directly associated with a bank account). In some embodiments, the MIT device may be enabled to use an ultra-wideband interface for "tap to pay" operations, thereby allowing for a high level of transaction security. In some embodiments, the MIT device may be implemented as a lending device, e.g., enabled to lend money via a third-party service, such as Venmo, PayPal, Apple Pay and so forth.

As another example, the MIT device may be attached to (or associated with) an article to be shared amongst a community of users, such as between neighbors within a neighborhood and/or between members of a social group. In some embodiments, the MIT device may aid in tracking of the article (e.g., last user, last and/or current location) as well as maintaining information associated with the article (e.g., users, locations, amount of usage, and so forth). Similarly, the MIT device may be implemented for inventory tracking (e.g., attached/associated with articles typically assigned or shared with users) for companies, sports teams, communities, and so forth.

In some embodiments, a multi-interface transponder (MIT) device, such as MIT device 108, may be used as a form of identification, e.g., for validation of visitors. For example, in some embodiments, an MIT device may become a digital representation of a person's identity. In some embodiments, the MIT device, e.g., in a secure memory, can store authentication information, such as a token. Further, the authentication information may be encrypted in a manner that allows for secure decryption and authentication. The representation may include description, images, current location, and/or intended location of the person. In some embodiments, a user may can scan for an MIT device and confirm location of the MIT device and the person's identity. For example, upon scanning for the MIT device (e.g., via a wireless device such as an AP 112, a wireless station 106, and/or a wireless node 107, the user may be provided with information to confirm the identity of the person, such as a photo identify the person, a log of the person's intended location, and so forth). In some embodiments, scanning may be implemented via a home security system, e.g., for identity confirmation and/or to authorize entry, or conversely, to not authorize entry and notify security. As another example, the MIT device may be implemented at part of a chain of trust, e.g., to allow in store pickups of online orders, signing for received shipments, and so forth.

Further Embodiments

In some embodiments, a multi-interface transponder device (MIT), e.g., as described herein, may include one or more radios (e.g., for supporting interfaces), at least one antenna, a memory, and one or more processors (e.g., processing circuitry, processing elements, and so forth). In some embodiments, the one or more radios may include one or more of a Bluetooth (BT) radio (e.g., any radio supporting various forms of Bluetooth, including Bluetooth Low Energy), an ultra-wideband (UWB) radio, and/or an ultra-low power radio (e.g., such as a wake-up radio and/or wake-up receiver). Additionally, in some embodiments, the MIT device may include motion sensing circuitry (e.g., a gyroscope, an accelerometer, and/or any of various other motion sensing components).

In some embodiments, the MIT device may be configured to:

enter a low power mode in which the second radio is disabled;

receive, while in the low power mode, a wake-up signal from a neighboring wireless device; and transmit, after transitioning to a higher power mode in response to receipt of the wake-up signal, beacons via the second radio, wherein the second radio is enabled in the higher power mode. In some embodiments, the wake-up signal may be received by an ultra-low power radio, e.g., via ULP/LP communications with the neighboring wireless device.

In some embodiments, the neighboring wireless device may comprise a companion device. In some embodiments, the companion device may have assisted the MIT device with registration with a location server. In some embodiments, the companion device and the MIT device may be associated with the location server. In some embodiments, the MIT may be configured to:

receive, from the neighboring wireless device, an indication that a location associated with the MIT device has been updated at the location server; and transition, based, at least in part, on the indication, to the low power mode.

In some embodiments, the wakeup signal may indicate a transmission rate. In some embodiments, the transmission rate may be based, at least in part, on one or more of a transportation mode detected by the neighboring wireless device and/or an expected medium congestion as detected by the neighboring wireless device. In some embodiments, the wakeup signal may indicate a transmission power. In some embodiments, the transmission power may be based, at least in part, on one or more of a transportation mode detected by the neighboring wireless device and/or an expected medium congestion as detected by the neighboring wireless device.

In some embodiments, the second radio may comprise an ultra-wideband radio.

In some embodiments, the neighboring wireless device may comprise a non-companion device. In some embodiments, the non-companion device and the MIT device may be associated with a location server.

In some embodiments, the wakeup signal may be received via the first radio. In some embodiments, the first radio may comprise one of a Bluetooth radio and/or an ultra-low power radio (e.g., such as a wake-up radio and/or wake-up receiver).

In some embodiments, the MIT may be further configured to determine a first condition of the MIT device based, at least in part, on a duration of time since communication with a companion device and transition to a lost mode of operation based on the first condition. In some embodiments, the companion device may have assisted the MIT device with registration with a location server. In some embodiments, the companion device and the MIT device may be associated with the location server. In some embodiments, when in the lost mode of operation, the MIT device may be configured to transmit, via the first radio, beacons at a first periodic interval during a first portion of a day and transmit, via the first radio, beacons at a second periodic interval during a second portion of the day. In some embodiments, he first portion of the day may at least partially correspond to daylight hours and the second portion of the day may at least partially correspond to non-daylight hours. In some embodiments, the second periodic interval may longer than the first periodic interval. In some embodiments, the MIT device may be configured to increase transmission power for beacons transmitted via the first radio, based, at least in part on one of the duration of time or time of day. In some embodiments, the first radio may comprise a Bluetooth radio. In some embodiments, the first condition of the MIT device may be further based, at least in part, on a duration of time since an indication of a location update or reception of a signal from a neighboring wireless device.

In some embodiments, the MIT device may be configured to:

operate in a low power mode in which an ultra-wide band (UWB) radio in communication with the at least one processor is disabled;

receive, while operating in the low power mode, a wake-up signal from a neighboring wireless device;

generate instructions to transition out of the low power mode and enable the UWB radio in response to receipt of the wake-up signal; and generate instructions to transmit, via the UWB radio, location beacons to the neighboring wireless device. In some embodiments, the wake-up signal may be received by an ultra-low power radio, e.g., via ULP/LP communications with the neighboring wireless device.

In some embodiments, the wakeup signal may be received via one of a Bluetooth radio or an ultra-low power radio (e.g., such as a wake-up radio and/or wake-up receiver) in communication with the at least one processor.

In some embodiments, the wakeup signal may indicate a transmission rate and a transmission power for the location beacons.

In some embodiments, the MIT device may be further configured to:

receive, from the neighboring wireless device an indication that a location associated with the MIT device has been updated at a location server; and generate instructions to transition to the low power mode and disable the UWB radio.

In some embodiments, the wakeup signal may indicate a transmission rate and a transmission power for the location beacons. In some embodiments, each of the transmission rate and the transmission power may be based, at least in part, on one or more of a transportation mode detected by the neighboring wireless device and/or an expected medium congestion as detected by the neighboring wireless device.

In some embodiments, the MIT device may be configured to:

broadcast location beacons at a first transmission rate and first transmission power;

increase, in response to detection of a trigger condition, the first transmission rate to a second transmission rate; and broadcast location beacons at the second transmission rate and first transmission power.

In some embodiments, the trigger condition may comprise receipt of an indication that a companion device has moved more than a threshold distance from the MIT device. In some embodiments, the indication may be received via the first radio and location beacons may be transmitted via the second radio. In some embodiments, the threshold distance may be approximately 1 meter.

In some embodiments, the MIT device may be configured to:

receive, from a companion device, an indication to increase transmission power to a second transmission power, wherein the indication is based, at least in part, on medium congestion; and transmit, to the companion device, location beacons at the second transmission power.

In some embodiments, prior to broadcasting location beacons at the first transmission rate and first transmission power, the MIT device may be configured to:

receive, while operating in a low power mode, an indication of a transition in transportation mode from a companion device, wherein the second radio is disabled in the low power mode; and transition, based on the indication, to a higher power mode, wherein the second radio is enabled in the higher power mode.

In some embodiments, the MIT device may be configured to:

receive, from the companion device, an indication of an end of a transition in a transportation mode; and transition, in response to the indication, back to the low power state.

In some embodiments, the trigger condition may comprise detection of a transition in a transportation mode. The transition may comprise a stopping of the mode of transportation. In some embodiments, the determination may be based on a change in velocity of the MIT device.

In some embodiments, the MIT device may be configured to:

determine, while in a first power state, to transition to a second power state based, at least in part, on detection of an event detectable via one of a first interface (e.g., supported by a first radio of the one or more radios) and/or motion sensing circuitry of the MIT device;

transition from the first power state to the second power state;

transmit, while in the second power state, one or more beacons via one of a second interface (e.g., supported by a second radio of the one or more radios) or a third interface (e.g., supported by a third radio of the one or more radios) of the MIT device;

receive, from a neighboring wireless device while in the second power state, an indication that a location associated with the MIT device has been updated at a location server; and determining to transition, based, at least in part, on the indication, to a third power state.

In some embodiments, selection of the second interface or third interface may be based, at least in part, on the detected event. In some embodiments, the neighboring wireless device and the MIT device may each be associated with the location server.

In some embodiments, the first interface may be an ultra-low power radio frequency (RF) interface (e.g., such as a wake-up radio and/or wake-up receiver). In other words, the first radio, in some embodiments, may be an ultra-low power radio. In some embodiments, the first interface may be a Bluetooth (BT) interface. Thus, in such embodiments, the first radio may be a Bluetooth radio.

In some embodiments, the second interface may be one of a Bluetooth interface and an ultra-wideband (UWB) radio frequency (RF) interface and the third interface may be one of a (BT) Bluetooth interface and an UWB RF interface. In other words, the second and third radios, in some embodiments, may be one of a BT radio and/or a UWB radio.

In some embodiments, the event detectable via the first interface may include receiving a wakeup signal from a companion device. In some embodiments, the wakeup signal may include instructions for transitioning to the second power state. In some embodiments, the instructions may indicate that the MIT device activates the third interface, e.g., when the third interface includes an UWB RF interface. In some embodiments, the instructions may indicate that the MIT device activates the second interface, e.g., when the second interface comprises a BT interface.

In some embodiments, the instructions may indicate a transmission rate. In some embodiments, the transmission rate may be based, at least in part, on a transportation mode detected by the companion device. In some embodiments, the transmission rate may be based, at least in part, on expected medium congestion as detected by the companion device.

In some embodiments, the instructions may indicate a transmission power. In some embodiments, the transmission power may be based, at least in part, on a transportation mode detected by the companion device. In some embodiments, the transmission power may be based (and/or further based), at least in part, on expected medium congestion as detected by the companion device.

In some embodiments, the neighboring wireless device may be a companion device that may have assisted the MIT device with registration with the location server. In some embodiments, the neighboring wireless device may be a non-companion device that may be associated with the location server.

In some embodiments, the MIT device may be configured to:

determine a first condition of the MIT device based, at least in part, on a duration of time since communication with a companion device; and transition to a first mode of operation based on the first condition.

In some embodiments, the first mode of operation may include any, any combination of, and/or all of transmitting beacons over a first interface at a first periodic interval during a first portion of a day, transmitting beacons over the first interface at a second periodic interval during a second portion of the day, and/or increasing transmission power for beacons, based, at least in part on one of the duration of time and/or time of day. In some embodiments, the first portion of the day may at least partially correspond to daylight hours. In some embodiments, the second portion of the day may at least partially correspond to non-daylight hours. In some embodiments, the second periodic interval may be longer than the first periodic interval.

In some embodiments, the first condition of the MIT device may be further based, at least in part, on a duration of time since an indication of a location update and/or reception of a signal from a neighboring device.

In some embodiments, the first periodic interval may be adjusted based, at least in part, on transmit power.

In some embodiments, the MIT device may be further configured to:

receive a signal from a neighboring wireless device; and increase transmission frequency and/or transmission power in response to receiving the signal.

In some embodiments, the first mode of operation may further include a power conservation period. In some embodiments, the power conservation period may at least 10 times longer than the first or second portions of the day. In some embodiments, the power conservation period may be at least 100 times longer than the first or second portions of the day. In some embodiments, the power conservation period may be at least 1000 times longer than the first or second portions of the day.

In some embodiments, the first interface may be a Bluetooth interface.

In some embodiments, the MIT device may be configured to:

receive, via a first interface and while in a first power state, an indication of a transition in transportation mode from a companion device;

transition, in response to the indication, to a second power state; and transmitting, over a second interface, one or more beacons at a first transmission rate and first transmission power to the companion device.

In some embodiments, transitioning to the second power state may activate the second interface. In some embodiments, the second interface may consume more power than the first interface.

In some embodiments, the first interface may be an ultra-low power wakeup radio frequency interface. In some embodiments, the second interface may one of a Bluetooth interface or ultra-wideband RF interface.

In some embodiments, the MIT device may be further configured to:

receive, from the companion device, an indication of an end of the transition in transportation mode; and transition, in response to the indication, back to the first power state.

In some embodiments, the MIT device may be further configured to:

receive, from the companion device, an indication that the companion device has moved more than a threshold distance from the MIT device; and increase, in response to the indication, transmission rate of the one or more beacons.

In some embodiments, the threshold distance may be approximately 1 meter. In some embodiments, the threshold distance may be greater than 2 feet but less than 3 feet.

In some embodiments, the MIT device may be further configured to receive, from the companion device, an indication to increase transmission power, wherein the indication is based, at least in part, on medium congestion.

In some embodiments, the companion device may be at least one of a user equipment device or a wearable device.

In some embodiments, the transportation mode may include at least one of a vehicle, a train, a boat, or a plane.

In some embodiments, a wireless device, such as a client station and/or a wireless node, e.g., as described herein, may be configured as a companion device to a multi-interface transponder (MIT) device, e.g., as described herein. The wireless device may include may include one or more radios (e.g., for supporting one or more interfaces), at least one antenna, a memory, and one or more processors (e.g., processing circuitry, processing elements, and so forth). In some embodiments, the one or more radios may include one or more of a Bluetooth (BT) radio (e.g., any radio supporting various forms of Bluetooth, including Bluetooth Low Energy), an ultra-wideband (UWB) radio, an ultra-low power radio (e.g., such as a wake-up radio and/or wake-up receiver), and/or a cellular radio. Additionally, in some embodiments, the wireless device may include motion sensing circuitry (e.g., a gyroscope, an accelerometer, and/or any of various other motion sensing components).

In some embodiments, the wireless device may be configured to:

transmit, to an MIT device, instructions to activate an ultra-wideband interface;

receive, from the MIT device, one or more signals via ultra-wideband communications;

determine, based on the received one or more signals, a location of the MIT device relative to the wireless device;

display, via a user interface, an indication of the location of the MIT device relative to the wireless device; and update, based on movement of the wireless device, the location of the MIT device relative to the wireless device.

In some embodiments, the instructions may be transmitted via an ultra-low power radio frequency signal.

In some embodiments, the indication may be displayed via a map displayed on a display of the wireless device.

In some embodiments, the indication may include an augmented reality rendering of the location of the MIT device relative to the wireless device.

In some embodiments, the wireless device may be further configured to, in response to determining the location of the MIT device, transmit instructions to the MIT device to deactivate the ultra-wideband interface of the MIT device. In some embodiments, the wireless device may be further configured to, in response to determining the location of the MIT device, transmit a location update message to a location server.

As described above, one aspect of the present technology is the gathering and use of data available from specific and legitimate sources to track and/or update a location of a multi-interface transponder (MIT) device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, tracking and/or updating location of an MIT device may aid the user in maintaining location of various items of importance, such as keys, luggage, musical equipment, sports equipment, backpacks, briefcases, and the like.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A transponder device, comprising:
   a memory;
   a power source; and
   at least one processor in communication with the memory and the power source;
   wherein the at least one processor is configured to cause the transponder device to selectively operate in:
     a first mode, wherein the transponder device transmits beacons at a first transmission power and a first transmission rate;
     a second mode, wherein the transponder device transmits beacons at a second transmission power and a second transmission rate, wherein the second transmission power is greater than the first transmission power and the second transmission rate is less than the first transmission rate, and wherein the second mode is not entered until a duration of time since a last location update passes a threshold amount of time; and
     a third mode, wherein the transponder device does not transmit beacons.

2. The transponder device of claim 1,
   wherein the at least one processor is further configured to cause the transponder device to transition between at least two modes of the first mode, the second mode, and the third mode based, at least in part, on a power value of the power source.

3. The transponder device of claim 1,
   wherein the at least one processor is further configured to:
     select a mode of the first mode, second mode, or third mode to conserve power of the power source based, at least in part, on of a duration of time since a last location update of the transponder device.

4. The transponder device of claim 1,
   wherein, in the first mode, the at least one processor is further configured to cause the transponder device to transmit beacons at the first transmission power and the first transmission rate for a portion of time corresponding to daylight hours.

5. The transponder device of claim 1,
   wherein, in the first mode, the at least one processor is further configured to cause the transponder device to transmit beacons at the first transmission power and the first transmission rate over a first interface; and
   wherein, in the second mode, the at least one processor is further configured to cause the transponder device to transmit beacons at the second transmission power and the second transmission rate over a second interface.

6. The transponder device of claim 5,
   wherein the first interface is a Bluetooth interface; and
   wherein the second interface is an ultra-wideband interface.

7. The transponder device of claim 1,
   wherein the at least one processor is further configured to:
     receive, while in the third mode, a wake-up signal from a neighboring wireless device.

8. The transponder device of claim 7,
   wherein the wake-up signal is received via low-power communications or ultra-low power communications.

9. A non-transitory computer readable memory medium storing program instructions executable by processing circuitry of a transponder device to cause the transponder device to:
   selectively operate in:
     a first mode, wherein the transponder device transmits beacons at a first transmission power and a first transmission rate;
     a second mode, wherein the transponder device transmits beacons at a second transmission power and a second transmission rate, wherein the second transmission power is greater than the first transmission power and the second transmission rate is less than the first transmission rate; and
     a third mode, wherein the transponder device does not transmit beacons; and
   select a mode of the first mode, second mode, or third mode to conserve power of a power source of the transponder device based, at least in part, on of a duration of time since a last location update of the transponder device.

10. The non-transitory computer readable memory medium of claim 9,
    wherein the program instructions are further executable by the processing circuitry of the transponder device to cause the transponder device to transition between at least two modes of the first mode, the second mode, and the third mode based, at least in part, on a power value of a power source of the transponder device.

11. The non-transitory computer readable memory medium of claim 9,
    wherein, in the first mode, the program instructions are further executable by the processing circuitry of the transponder device to cause the transponder device to transmit beacons at the first transmission power and the first transmission rate for a portion of time corresponding to daylight hours.

12. The non-transitory computer readable memory medium of claim 9,
    wherein the program instructions are further executable by the processing circuitry of the transponder device to cause the transponder device to not enter the second mode until a duration of time since a last location update passes a threshold amount of time.

13. The non-transitory computer readable memory medium of claim 9,
wherein, in the first mode, the program instructions are further executable by the processing circuitry of the transponder device to cause the transponder device to transmit beacons at the first transmission power and the first transmission rate over a first interface; and
wherein, in the second mode, the program instructions are further executable by the processing circuitry of the transponder device to cause the transponder device to transmit beacons at the second transmission power and the second transmission rate over a second interface.

14. The non-transitory computer readable memory medium of claim 13,
wherein the first interface is a Bluetooth interface; and
wherein the second interface is an ultra-wideband interface.

15. An apparatus, comprising:
a memory; and
at least one processor in communication with the memory, wherein the at least one processor is configured to selectively operate in:
   a first mode, wherein the at least one processor generates instructions to transmit beacons at a first transmission power and a first transmission rate over a first interface in communication with the at least one processor;
   a second mode, wherein the at least one processor generates instructions to transmit beacons at a second transmission power and a second transmission rate over a second interface in communication with the at least one processor, wherein the second transmission power is greater than the first transmission power and the second transmission rate is less than the first transmission rate; and
   a third mode, wherein the at least one processor generates instructions to not transmit beacons.

16. The apparatus of claim 15,
wherein the at least one processor is further configured to:
   generate instructions to transition between at least two modes of the first mode, the second mode, and the third mode based, at least in part, on a power value of a power source in communication with the at least one processor.

17. The apparatus of claim 15,
wherein the at least one processor is further configured to:
   generate instructions to select a mode of the first mode, second mode, or third mode to conserve power of a power source in communication with the at least one processor based, at least in part, on of a duration of time since a last location update.

18. The apparatus of claim 15,
wherein, in the first mode, the at least one processor is further configured to generate instructions to transmit beacons at the first transmission power and the first transmission rate for a portion of time corresponding to daylight hours.

19. The apparatus of claim 15,
wherein the at least one processor is further configured to generate instructions to not enter the second mode until a duration of time since a last location update passes a threshold amount of time.

20. The apparatus of claim 15,
wherein the first interface is a Bluetooth interface; and
wherein the second interface is an ultra-wideband interface.

* * * * *